US012562546B2

(12) United States Patent　　　(10) Patent No.: US 12,562,546 B2
Taira et al.　　　(45) Date of Patent: Feb. 24, 2026

(54) OPTICAL OSCILLATOR, METHOD FOR DESIGNING OPTICAL OSCILLATOR, AND LASER DEVICE

(71) Applicant: INTER-UNIVERSITY RESEARCH INSTITUTE CORPORATION NATIONAL INSTITUTES OF NATURAL SCIENCES, Mitaka (JP)

(72) Inventors: Takunori Taira, Okazaki (JP); Hwan Hong Lim, Okazaki (JP)

(73) Assignee: INTER-UNIVERSITY RESEARCH INSTITUTE CORPORATION NATIONAL INSTITUTES OF NATURAL SCIENCES, Mitaka (JP)

( * ) Notice: Subject to any disclaimer, the term of this patent is extended or adjusted under 35 U.S.C. 154(b) by 693 days.

(21) Appl. No.: 17/910,898

(22) PCT Filed: Mar. 12, 2021

(86) PCT No.: PCT/JP2021/010143
§ 371 (c)(1),
(2) Date: Sep. 12, 2022

(87) PCT Pub. No.: WO2021/182619
PCT Pub. Date: Sep. 16, 2021

(65) Prior Publication Data
US 2023/0137277 A1　May 4, 2023

(30) Foreign Application Priority Data
Mar. 13, 2020　(JP) ................................ 2020-044709

(51) Int. Cl.
*H01S 3/113*　(2006.01)
*H01S 3/08*　(2023.01)
(Continued)

(52) U.S. Cl.
CPC .......... *H01S 3/113* (2013.01); *H01S 3/08081* (2013.01); *H01S 3/09415* (2013.01); *H01S 3/094053* (2013.01); *H01S 2301/203* (2013.01)

(58) Field of Classification Search
CPC . H01S 3/113; H01S 3/08081; H01S 2301/203
See application file for complete search history.

(56) References Cited

U.S. PATENT DOCUMENTS 4,553,244 A * 11/1985 Benedict ............. H01S 3/08081
372/99
4,903,271 A * 2/1990 Yasui ..................... G02B 27/09
372/99
(Continued)

FOREIGN PATENT DOCUMENTS

CN　　112771735 A　　5/2021
JP　　H01-258483 A　10/1989
(Continued)

OTHER PUBLICATIONS

Kausas, A., et al., "Giant-pulse Nd:YVO₄ microchip laser with MW-level peak power by emission cross-sectional control," Opt. Express , 2016, 24(4), pp. 3137-3149.
(Continued)

*Primary Examiner* — James A Menefee
(74) *Attorney, Agent, or Firm* — Faegre Drinker Biddle & Reath LLP

(57) ABSTRACT

An optical oscillator includes a first reflection part configured to reflect light of a first wavelength, a laser medium excited by excitation light of a second wavelength different from the first wavelength and configured to emit light of the first wavelength, a second reflection part configured to form an unstable resonator together with the first reflection part, the unstable resonator being configured to output annular laser light of the first wavelength, and a saturable absorption part disposed between the laser medium and the second (Continued)

reflection part and of which a transmittance increases with absorption of light of the first wavelength. When a power of the excitation light is indicated by $P_p$ (kW), and an inner diameter of the annular laser light is indicated by $d_i$, and an outer diameter is indicated by $d_o$, and $d_o/d_i$ is a magnification m, the magnification m satisfies $a_0 + a_1 \log(P_p) \le m \le b_0 + b_1 P_p + b_2 P_p^2$.

7 Claims, 22 Drawing Sheets

(51) Int. Cl.
    H01S 3/0941      (2006.01)
    H01S 3/094      (2006.01)

(56) References Cited

U.S. PATENT DOCUMENTS

| | | | |
|---|---|---|---|
| 2017/0107966 A1 | 4/2017 | Kanehara et al. | |
| 2021/0003108 A1* | 1/2021 | Ishikawa | H01S 3/094061 |

FOREIGN PATENT DOCUMENTS

| | | |
|---|---|---|
| JP | H01-270370 A | 10/1989 |
| JP | H02-001192 A | 1/1990 |
| JP | H02-065282 A | 3/1990 |
| JP | H05-75185 A | 3/1993 |
| JP | H6-291393 A | 10/1994 |
| JP | H08-056027 A | 2/1996 |
| JP | H9-102641 A | 4/1997 |
| JP | 2019-167888 A | 10/2019 |

OTHER PUBLICATIONS

Lü, Baida, et al., "The beam quality of annular lasers and related problems," J. Mod. Opt., 2001, 48, pp. 1171-1178.

Pavel, N., et al., "High average power diode end-pumped composite Nd:YAG laser passively Q-switched by $Cr^{4+}$:YAG saturable absorber," Jpn. J. Appl. Phys., 2001, 40(Part 1, No. 3A), pp. 1253-1259.

Sakai, H., et al., "1 MW peak power single-mode high-brightness passively Q-switched $Nd^{3+}$:YAG microchip laser," Optics Express, 2008, vol. 16, Issue 24, pp. 19891-19899.

Taira, Takunori, "Micro-Domain Controlled High-Power Laser Materials," Applied Physics, 2016, vol. 85, No. 10, pp. 863-869.

Tsunekane, Masaki, et. al., "High Peak Power, Passively Q-switched Microlaser for Ignition of Engins," IEEE Journal of Quantum Eletronics, Feb. 2010, vol. 46, No. 2, pp. 277-284.

Tsunekane, Masaki, et. al., "High Peak Power, Passively Q-switched Yb:YAG/Cr:YAG Micro-Lasers," IEEE Journal of Quantum Elctronics, May 2013, vol. 49, No. 5, pp. 454-461.

Extended European Search Report issued Dec. 15, 2023 in Application No. 21767694.9.

J. J. Zayhowski et al., "Pump-Induced Bleaching of the Saturable Absorber in Short-Pulse Nd:YAG/$Cr^{4+}$:YAG Passively Q-Switched Microchip Lasers," IEEE Journal of Quantum Electronics, IEEE, USA, vol. 39, No. 12, Dec. 1, 2003, p. 1588-p. 1593, XP011104364.

International Preliminary Report on Patentability mailed Sep. 22, 2022 for PCT/JP2021/010143.

* cited by examiner

OPTICAL OSCILLATOR, METHOD FOR DESIGNING OPTICAL OSCILLATOR, AND LASER DEVICE

TECHNICAL FIELD

The present invention relates to an optical oscillator, a method for designing an optical oscillator, and a laser device.

BACKGROUND ART

In this technical field, technologies described in Non-Patent Literatures 1 to 3 are known. Each of the optical oscillators described in Non-Patent Literatures 1 to 3 is a passive Q-switched microchip laser including a pair of plane mirrors constituting a resonator, a ceramic laser medium disposed between the pair of plane mirrors, and a ceramic Q-switch element.

CITATION LIST

Patent Literature

[Non-Patent Literature 1] Taira, Takunori, "Micro-domain controlled high power laser materials," Applied Physics, 2016, Vol. 85, No. 10, p. 863-869

[Non-Patent Literature 2] Masaki Tsunekane, et. al., "High Peak Power, Passively Q-switched Microlaser for Ignition of Engines," IEEE JOURNAL OF QUANTUM ELECTRONICS, February 2010, VOL. 46, NO. 2, p. 277-284

[Non-Patent Literature 3] Masaki Tsunekane, et. al., "High Peak Power, Passively Q-switched Yb:YAG/Cr:YAG Micro-Lasers," IEEE JOURNAL OF QUANTUM ELECTRONICS, May 2013, VOL. 49, NO. 5, p. 454-461

SUMMARY OF INVENTION

Technical Problem

Laser light may be condensed by a condensing optical system (for example, a lens), and the high energy at a condensing position may be used. At this time, preferably, the energy in an Airy disk (hereinafter, also referred to as "effective energy") in the laser light at the condensing position is high. The energy of the laser light depends on the energy of excitation light.

Therefore, an object of the present invention is to provide a technology capable of realizing high effective energy with respect to the energy of excitation light at a condensing position when laser light is condensed.

Solution to Problem

An optical oscillator according to one aspect of the present invention includes a first reflection part configured to reflect light of a first wavelength, a laser medium excited by excitation light of a second wavelength different from the first wavelength and configured to emit light of the first wavelength, a second reflection part disposed on a side opposite to the first reflection part with respect to the laser medium and configured to form an unstable resonator together with the first reflection part, the unstable resonator being configured to output annular laser light of the first wavelength, and a saturable absorption part disposed on the side opposite to the first reflection part with respect to the laser medium and of which a transmittance increases with absorption of light of the first wavelength, wherein, when a power of the excitation light of the second wavelength is indicated by $P_p$ (kW), an inner diameter of the annular laser light is indicated by $d_i$ (mm), and an outer diameter is indicated by $d_o$ (mm), and $d_o/d_i$ is a magnification m, the magnification m satisfies the following Equation (A): $a_0 + a_1 \mathrm{Log}(P_p) \leq m \leq b_0 + b_1 P_p + b_2 P_p^2$ . . . (1), provided that,
$a_0 = 1.421$
$a_1 = 0.10678$
$b_0 = 2.8698$
$b_1 = 0.79408$
$b_2 = -0.022536$.

In such a configuration, since the unstable resonator is provided, pulsed annular laser light is output. When the annular laser light is condensed by the condensing optical system, the energy of an Airy disk (a central part) of the annular laser light at a condensing position is referred to as the effective energy. In the optical oscillator, the magnification m satisfies Equation (A). Therefore, it is possible to realize high effective energy with respect to the energy of the excitation light.

A size of the second reflection part may be smaller than that of the first reflection part when seen from the first reflection part.

A laser device according to another aspect of the present invention includes the optical oscillator, and an excitation light supply part configured to output the excitation light supplied to the laser medium. In such a configuration, since the unstable resonator is provided, pulsed annular laser light is output. In the optical oscillator, the magnification m satisfies Equation (A). Therefore, it is possible to realize high effective energy with respect to the energy of the excitation light.

The laser device may further include a condensing optical system configured to condense the annular laser light output from the unstable resonator.

The laser device may further include a non-linear optical system configured to convert the annular laser light output from the unstable resonator.

A method for designing an optical oscillator according to yet another aspect of the present invention is a method for designing an optical oscillator which includes a first reflection part configured to reflect light of a first wavelength, a laser medium excited by excitation light of a second wavelength different from the first wavelength and configured to emit light of the first wavelength, a second reflection part disposed on a side opposite to the first reflection part with respect to the laser medium and configured to form an unstable resonator together with the first reflection part, the unstable resonator being configured to output annular laser light of the first wavelength, and a saturable absorption part disposed on the side opposite to the first reflection part with respect to the laser medium and of which a transmittance increases with absorption of light of the first wavelength, wherein, in a case in which the annular laser light output from the unstable resonator is condensed by supplying the excitation light to the laser medium, when a conversion efficiency of an energy in an Airy disk of the annular laser light with respect to an energy of the excitation light is defined as an effective energy conversion efficiency $\eta_{eff}$ (%), an inner diameter of the annular laser light is indicated by $d_i$ (mm), and an outer diameter is indicated by $d_o$ (mm), and $d_o/d_i$ is a magnification m, a conversion efficiency distribution that is a distribution of the effective energy conversion efficiency $\eta_{eff}$ with respect to the magnification m is obtained, and the magnification m is set so that a standardized effective energy conversion efficiency obtained by standardizing the effective energy conversion efficiency $\eta_{eff}$ with a maximum effective energy conversion efficiency in the conversion efficiency distribution is 50% or more.

The magnification m set by the above-described designing method can satisfy Equation (A). Therefore, when the annular laser light output from the optical oscillator designed as described above is condensed, it is possible to realize high effective energy with respect to the energy of the excitation light at the condensing position.

Another example of the optical oscillator according to the present invention includes a first reflection part configured to reflect light of a first wavelength, a laser medium excited by excitation light of a second wavelength different from the first wavelength and configured to emit light of the first wavelength, a second reflection part disposed on a side opposite to the first reflection part with respect to the laser medium and configured to form an unstable resonator configured to output annular laser light of the first wavelength together with the first reflection part, and a saturable absorption part disposed on the side opposite to the first reflection part with respect to the laser medium and of which a transmittance increases with absorption of light of the first wavelength, wherein, when an inner diameter of the annular laser light is indicated by $d_i$(mm), and an outer diameter is indicated by $d_o$(mm), and $d_o/d_i$ is an magnification m, the magnification m is larger than $2^{1/2}$.

In such a configuration, since the unstable resonator is provided, pulsed annular laser light is output. The optical oscillator has a magnification m larger than $2^{1/2}$. Therefore, it is possible to realize high effective energy with respect to the energy of the excitation light.

Another example of the laser device according to the present invention includes the above-described optical oscillator as another example, and an excitation light supply part configured to output the excitation light supplied to the laser medium, wherein, when a power of the excitation light is 1.5 kW or more and 12 kW or less, the magnification m is 1.44 or more and 4.01 or less, when a power of the excitation light is 3 kW or more and 12 kW or less, the magnification m is 1.47 or more and 5.1 or less, or when a power of the excitation light is 6 kW or more and 12 kW or less, the magnification m is 1.50 or more and 6.82 or less.

Advantageous Effects of Invention

According to the present invention, it is possible to provide a laser device and an optical oscillator capable of realizing high effective energy.

DESCRIPTION OF EMBODIMENTS

Figure 1:
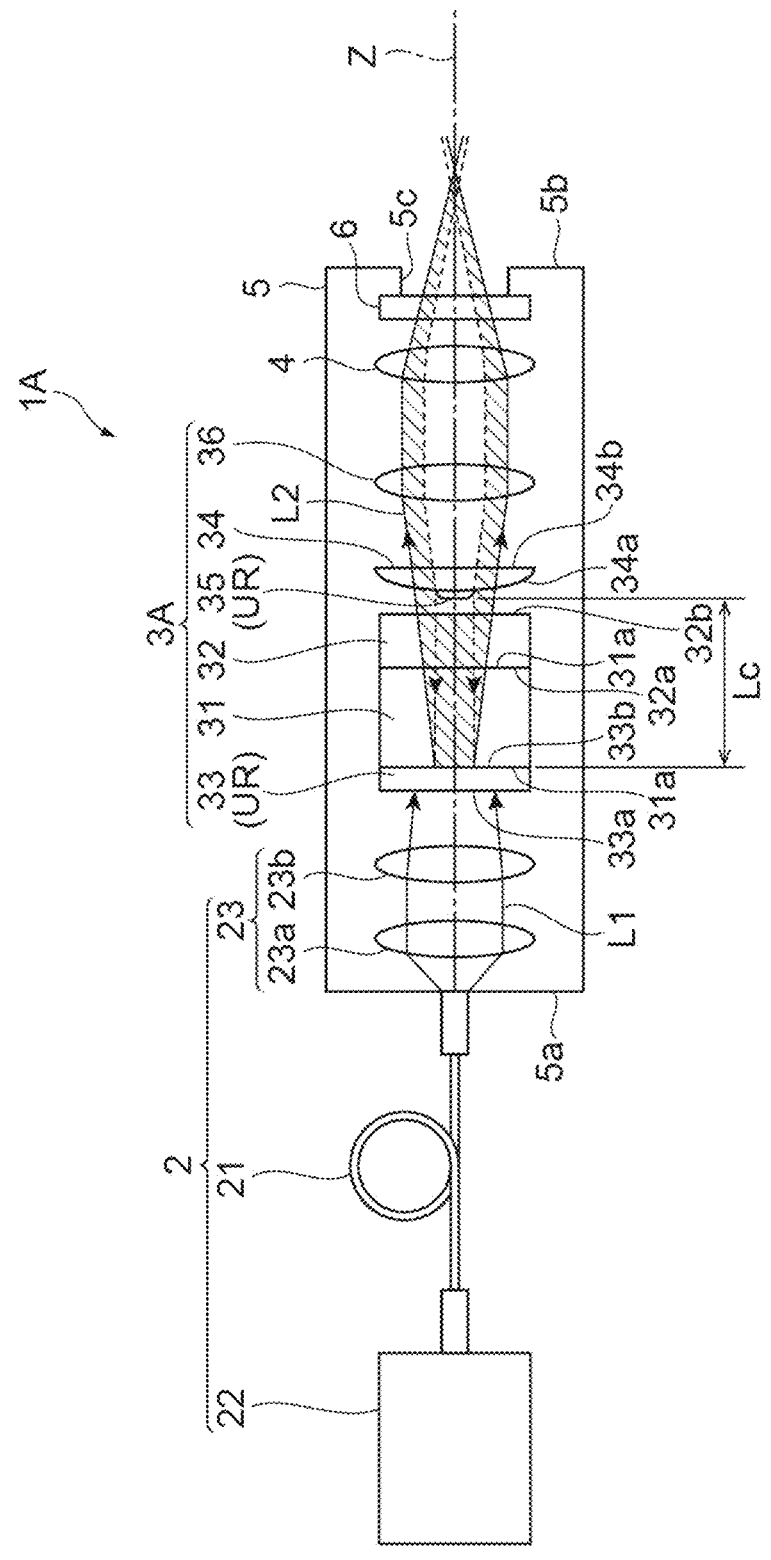
FIG. 1 is a view showing a schematic configuration of a laser device according to an embodiment.

Hereinafter, embodiments of the present invention will be described in detail with reference to the accompanying drawings. In the description of the drawings, the same reference numerals are used for the same or equivalent elements, and duplicate description will be omitted. Dimensional ratios in the drawings do not always match those described.

As shown in FIG. 1, a laser device 1A according to an embodiment includes an excitation light supply part 2, an optical oscillator 3A, and a condensing optical system 4. The laser device 1A outputs pulsed laser light L2 when excitation light L1 supplied from the excitation light supply part 2 is incident on the optical oscillator 3A. The laser device 1A according to the present embodiment is a passive Q-switched laser device. In the laser device 1A, the pulsed laser light L2 is further condensed by the condensing optical system 4. The laser device 1A is appropriately used for laser ignition, laser-induced breakdown spectroscopy, a variety of laser processing for the purpose of ablation, or surgery using laser light. In the present embodiment, the pulsed laser light L2 has a first wavelength, and the excitation light L1 has a second wavelength.

The second wavelength is, for example, a wavelength of 808 nm or a wavelength of 885 nm when a laser medium 31 included in the optical oscillator 3A is Nd:YAG, and a wavelength of 940 nm or a wavelength of 968 nm when the laser medium 31 is Yb:YAG. The first wavelength is, for example, a wavelength of 1064 nm when the laser medium 31 is Nd:YAG, and a wavelength of 1030 nm when the laser medium 31 is Yb:YAG.

The excitation light supply part 2 has a configuration capable of supplying the excitation light L1 to the optical oscillator 3A. The excitation light supply part 2 includes, for example, an optical fiber 21, a laser diode (LD) 22, and an incident optical system 23. The excitation light supply part 2 may have a bundle of a plurality of optical fibers 21.

The excitation light supply part 2 may have a configuration in which the optical fiber 21 is not provided and the excitation light L1 is supplied from the LD 22 to the optical oscillator 3A via the incident optical system 23.

The LD 22 outputs the excitation light L1. A power of the excitation light L1 is, for example, 0.8 kW or more. The LD 22 may be oscillated in a continuous wave or may be oscillated in a quasi-continuous wave. An input end of the optical fiber 21 is coupled to the LD 22. The optical fiber 21 outputs the excitation light L1 output from the LD 22 to the incident optical system 23. The incident optical system 23 condenses the excitation light L1 output from the optical fiber 21 and causes the excitation light L1 to be incident on the optical oscillator 3A. The incident optical system 23 includes, for example, a lens 23a and a lens 23b as shown in FIG. 1. The excitation light L1 may be incident on the first reflection part 33 as, for example, parallel light or loosely condensed light that is substantially close to the parallel light.

The optical oscillator 3A includes a laser medium 31, a Q-switch element (a saturable absorption part) 32, a first reflection part 33, a support 34, and a second reflection part 35. The first reflection part 33, the second reflection part 35, the laser medium 31, and the Q-switch element 32 are disposed in the order of the first reflection part 33, the laser medium 31, the Q-switch element 32, and the second reflection part 35 along a Z axis. The Z-axis corresponds to an optical axis of the optical oscillator 3A.

[Laser Medium]

The laser medium 31 forms a population inversion in which amplification exceeds absorption in an excited state, and amplifies light using stimulated emission. The laser medium 31 is also referred to as a gain medium. As the laser medium 31, various known laser media can be used as long as light having the first wavelength can be emitted by supplying the excitation light L1 having the second wavelength.

Examples of a material of the laser medium 31 include a light gain material formed of an oxide to which rare earth ions that serve as a center of light emission are added, a light gain material formed of an oxide to which transition metal ions that serve as a center of light emission are added, a light gain material formed of an oxide that serves as a color center, and the like.

Examples of the rare earth ions include Ce, Pr, Nd, Pm, Sm, Eu, Gd, Tb, Dy, Ho, Er, Tm, and Yb. Examples of the transition metal ions include Ti, V, Cr, Mn, Fe, Co, Ni, and Cu. Examples of a base material include a garnet-based material such as YAG, YSAG, YGAG, YSGG, GGG, GSGG, and LuAG, a fluoride-based material such as YLF, LiSAF, LiCAF, $MgF_2$, and $CaF_2$, a vanadate-based material such as $YVO_4$, $GdVO_4$, and $LuVO_4$, an apatite-based material such as FAP, sFAP, VAP, and sVAP, an alumina-based material such as $Al_2O_3$ and $BeAl_2O_3$, a dioxide or trioxide-based material such as $Y_2O_3$, $Sc_2O_3$ and $Lu_2O_3$, and a tungstate-based material such as KGW and KYW. The base material may be a single crystal or a polycrystalline ceramic material. The base material may be various amorphous glasses.

Examples of a shape of the laser medium 31 include a plate shape and a columnar shape. In the embodiment shown in FIG. 1, a central axis of the laser medium 31 coincides with the Z axis. The laser medium 31 has a first end surface 31a and a second end surface 31b (a surface on the side opposite to the first end surface 31a in the Z-axis direction). The first end surface 31a and the second end surface 31b are orthogonal to the Z axis. An example of a length of the laser medium 31 in the Z-axis direction is 0.2 mm to 26 mm.

Examples of a shape (a shape in a plan view) of the laser medium 31 seen in the Z-axis direction include a circle, a rectangle, a square, and a polygon. When the shape of the laser medium 31 in a plan view is circular, an example of a diameter thereof is 1.4 mm to 100 mm. When the shape of the laser medium 31 in a plan view is a rectangle or a square, an example of an approximate diagonal length thereof is 1.9 mm to 140 mm.

Hereinafter, a shape of an element when seen in the Z-axis direction is also referred to as a "shape in a plan view" as described above.

The Q-switch element 32 is a saturable absorber having a characteristic that absorption capacity is saturated when intensity of the light of the first wavelength incident on the Q-switch element 32 increases. A transmittance of the Q-switch element 32 increases with absorption of the light having the second wavelength. The Q-switch element 32 may be disposed coaxially with the laser medium 31. The Q-switch element 32 may be joined to the second end surface 31b.

When seen in a Z-axis direction, a size of the Q-switch element 32 is, for example, Cr:YAG, and when the laser medium 31 is Nd:YAG, the laser medium 31 is smaller. When the laser medium 31 is Nd:$YVO_4$ or Yb:YAG, a length of the laser medium 31 in the Z-axis direction is shorter than that of the Q-switch element 32. Examples of a shape of the Q-switch element 32 include a plate shape and a columnar shape. The Q-switch element 32 has a first end surface 32a on the laser medium 31 side, and a second end surface 32b (a surface on the side opposite to the first end surface 32a in the Z-axis direction). The first end surface 32a is orthogonal to the Z axis. An example of a length of the Q-switch element 32 in the Z-axis direction is 0.1 to 10 mm.

When both the laser medium 31 and the Q-switch element 32 are made of ceramic, the laser medium 31 and the Q-switch element 32 may be sinter-joined, but more preferably surface-activation-joined. The surface activation joining is a method in which an oxide film or surface deposits on joining surfaces of materials to be joined in a vacuum are removed by ion beam irradiation or neutral atom beam (FAB) irradiation, and the joining surfaces that are flat and on which constituent atoms are exposed are joined to each other. The above-described joining is a direct joining using an intermolecular bond. In the surface activation joining, without limiting the laser medium to ceramics, not only single crystals joining or hybrid joining thereof can be performed, but also joining can be performed after applying an excitation light reflection coating or the like. When the laser medium 31 and the Q-switch element 32 are joined to form a joined body, a length (corresponding to a length in the Z-axis direction) of the laser medium 31 and the Q-switch element 32 in a joining direction of the joined body is smaller than, for example, 10 mm.

A coating layer for adjusting reflection characteristics (for example, reflection characteristics of the light having the second wavelength) of the second end surface 31b and the first end surface 32a may be provided on at least one of the second end surface 31b of the laser medium 31 and the first end surface 32a of the Q-switch element 32. When such a coating layer is provided on at least one of the second end surface 31b and the first end surface 32a, for example, the laser medium 31 and the Q-switch element 32 can be joined as described above with the coating layer interposed therebetween. A coating layer that functions as an HR coat for the excitation light L1 of the second wavelength and functions as an AR coat for the light of the first wavelength may be provided on at least one of the first end surface 32a and the second end surface 32b of the Q-switch element 32. However, when a composite resonator is formed, the coating layer may be a coating layer that realizes partial reflection with respect to the light of the first wavelength. Such a coating layer may be a part of the saturable absorption part. That is, the saturable absorption part may have the coating layer in addition to the saturable absorber (the Q-switch element 32 in FIG. 1), and when the coating layer is provided on an end surface of the saturable absorber, an end surface of the coating layer corresponds to the end surface of the saturable absorption part.

[First Reflection Part]

The first reflection part 33 is provided on the first end surface 31a of the laser medium 31. The first reflection part 33 transmits the excitation light L1 of the second wavelength while reflecting the light of the first wavelength. A transmittance of the first reflection part 33 with respect to the excitation light L1 of the second wavelength is 80% or more (preferably 95% or more), and a reflectance of the first reflection part 33 with respect to the light of the first wavelength is 90% or more (preferably 99% or more). The first reflection part 33 is, for example, a dielectric multilayer film. The first reflection part 33 is, for example, a dielectric multilayer film that functions as an AR coat for the excitation light L1 of the second wavelength and as an HR coat for the light of the first wavelength. When the first reflection part 33 is a dielectric multilayer film, the first reflection part 33 may be formed on the first end surface 31a by a thin film forming technique.

The first reflection part 33 has a first surface 33a and a second surface 33b. The first surface 33a is a surface on which the excitation light L1 is incident. The second surface 33b is a surface on the side opposite to the first surface 33a in the Z-axis direction. The first surface 33a and the second surface 33b are planes orthogonal to the Z axis. Therefore, the first reflection part 33 is a plane mirror having the above-described transmission characteristics and reflection characteristics. However, the first reflection part 33 may be a mirror having a curvature (a curved mirror), for example, a concave mirror.

[Support]

The support 34 is disposed apart from the Q-switch element 32. The support 34 supports the second reflection part 35. The support 34 transmits the light of the first wavelength (the pulsed laser light L2). A transmittance of the support 34 with respect to the light of the first wavelength is 90% or more. Examples of a material for the support 34 include glass. In the present embodiment, a central axis of the support 34 coincides with the Z axis.

The first surface 34a (the surface on the Q-switch element 32 side) of the support 34 is curved toward the Q-switch element 32 side. A radius of curvature of the first surface 34a is, for example, the same as that of the second reflection part 35. The second surface 34b (the surface on the side opposite to the Q-switch element 32) of the support 34 is, for example, a flat surface. An example of the support 34 is a plano-convex lens. The AR coat with respect to the light of the first wavelength may be applied to the first surface 34a. Such an AR coat may also be a part of the support 34. The second reflection part 35 is provided on the first surface 34a.

[Second Reflection Part]

The second reflection part 35 reflects the light of the first wavelength formed on the first surface 34a. The second reflection part 35 is, for example, a dielectric multilayer film. An optical axis of the second reflection part 35 coincides with the Z axis. A reflectance of the second reflection part 35 with respect to the light of the first wavelength is 80% or more (preferably 99% or more). The second reflection part 35 is, for example, a dielectric multilayer film that functions as an HR coat for the light of the first wavelength. When the second reflection part 35 is a dielectric multilayer film, the second reflection part 35 may be formed on the first surface 34a by a thin film forming technique.

The optical oscillator 3A may have a lens 36 as shown in FIG. 1. The lens 36 is a lens that parallelizes the pulsed laser light L2.

[Condensing Optical System]

The condensing optical system 4 is an optical system that condenses the pulsed laser light L2 output from the optical oscillator 3A. In the embodiment shown in FIG. 1, the condensing optical system 4 is a lens. An example of a focal length of the condensing optical system 4 is 5 mm to 500 mm.

The laser device 1A may further include an accommodation part 5. The accommodation part 5 is, for example, a housing. The accommodation part 5 accommodates the incident optical system 23, the optical oscillator 3A, and the condensing optical system 4. In this case, for example, an output end of the optical fiber 21 is mounted on a first end wall 5a of the accommodation part 5 (one of a pair of wall portions orthogonal to the Z axis). An opening 5c is formed in a second end wall 5b of the accommodation part 5 (the end wall on the side opposite to the first end wall 5a along the Z axis). The opening 5c is closed by a window member 6. The window member 6 is a member that is transparent to the pulsed laser light L2.

The optical oscillator 3A will be further described.

The first reflection part 33 and the second reflection part 35 included in the optical oscillator 3A form an unstable resonator UR. In the embodiment shown in FIG. 1, an optical axis of the unstable resonator UR formed by the first reflection part 33 and the second reflection part 35 coincides with the Z axis.

When seen in the Z-axis direction, a size of the second reflection part 35 is smaller than the size of the first reflection part 33. Further, the second reflection part 35 is curved toward the first reflection part 33 side. The second reflection part 35 is curved in the same manner as the first surface 34a, for example. Since the second reflection part 35 is curved as described above, the second reflection part 35 diverges the light of the second wavelength. Therefore, the first reflection part 33 and the second reflection part 35 form a magnification optical system.

When seen in the Z-axis direction, the second reflection part 35 has a circular or polygonal shape, and an example of a diameter or diagonal length thereof is 1 mm to 20 mm. The diameter or diagonal length of the second reflection part 35 may be 1 mm to 3 mm. An example of a radius of curvature of the second reflection part 35 is 10 mm to 2 m. An example of the radius of curvature of the second reflection part 35 may be 10 mm to 100 mm.

An example of a distance (hereinafter, referred to as a "resonator length Lc") between a portion of the second reflection part 35 closest to the first reflection part 33 (a top portion of the second reflection part 35) and the second surface 33b of the first reflection part 33 is about 4 mm to 50 mm. The resonator length Lc may be smaller than 15 mm.

Figure 2:
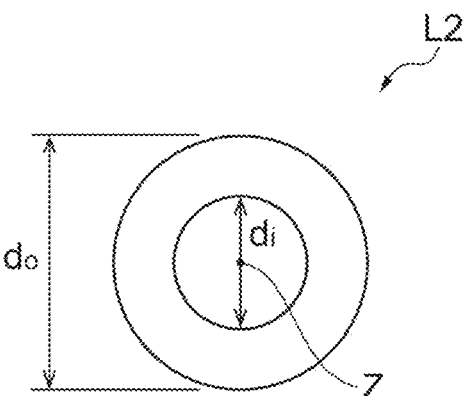
FIG. 2 is a schematic view showing an example of pulsed laser light output from the laser device shown in FIG. 1.

The first reflection part 33 and the second reflection part 35 form the unstable resonator UR. Therefore, as shown in FIG. 2, a donut-shaped (donut mode) pulsed laser light L2 (annular laser light) is output from the optical oscillator 3A with the Q-switch element 32. This point will be specifically described.

When the excitation light L1 from the excitation light supply part 2 is incident on the first surface 33$a$ of the first reflection part 33, the excitation light L1 passes through the first reflection part 33 and is supplied to the laser medium 31. Thus, the laser medium 31 is excited and light of the first wavelength is emitted. The light of the first wavelength emitted from the laser medium 31 is reflected by the second reflection part 35 toward the first reflection part 33. The first reflection part 33 reflects the light of the first wavelength. Thus, the light of the first wavelength passes through the laser medium 31 a plurality of times. The light of the first wavelength is amplified by stimulated emission when the light of the first wavelength passes through the laser medium 31, and is output as the pulsed laser light L2 by an action of the Q-switch element 32.

Since the second reflection part 35 is curved toward the first reflection part 33, the light of the second wavelength reflected by the second reflection part 35 is diverged. Therefore, the pulsed laser light L2 is output from the outside of the second reflection part 35 when seen in the Z-axis direction. As a result, a shape (an intensity distribution) of the pulsed laser light L2 is a donut (annular) shape as shown in FIG. 2. That is, the laser device 1A can output a donut-shaped pulsed laser light L2.

When an inner diameter of the pulsed laser light L2 is $d_i$, and an outer diameter of the pulsed laser light L2 is $d_o$, a magnification m is defined as $d_o/d_i$.

In the laser device 1A, when the excitation light L1 is input to the optical oscillator 3A, the donut-shaped pulsed laser light L2 is output. The laser device 1A has the condensing optical system 4. Therefore, the pulsed laser light L2 is condensed by the condensing optical system 4.

Here, characteristics of the laser device having the unstable resonator will be described with reference to a reference experimental example. Hereinafter, the donut-shaped pulsed laser light will be referred to as a donut beam in the description of the reference experimental example.

In the reference experimental example, the same laser device as the laser device 1A shown in FIG. 1 was used except that the accommodation part 5 and the window member 6 were not provided.

In the reference experimental example, the excitation light L1 is incident on the first reflection part 33 by the incident optical system 23 using the LD 22 in which the optical fiber 21 is coupled. The incident optical system 23 was a telescope using the lens 23$a$ and the lens 23$b$. An excitation method of LD 22, a wavelength of the excitation light L1 and an output power were as follows.

Excitation method: quasi-continuous wave excitation
    Wavelength of excitation light L1: 808 nm
    Output power of excitation light L1: 700 W Nd:YAG ceramic (addition amount of $Nd^{3+}$:1.1 at. %) was used for the laser medium 31. $Cr^{4+}$:YAG ceramic was used for the Q-switch element 32. An initial transmittance of the Q-switch element 32 was 30%. The laser medium 31 and the Q-switch element 32 were joined. A length of the joined body of the laser medium 31 and the Q-switch element 32 in the Z-axis direction was 7 mm, and a volume of the joined body was 6×6×7 mm³. Both end surfaces of the joined body of the laser medium 31 and the Q-switch element 32 (that is, the first end surface 31$a$ of the laser medium 31 and the second end surface 32$b$ of the Q-switch element 32) were subjected to AR coating for each light having a wavelength of 1064 nm and a wavelength of 808 nm.

For the first reflection part 33, a plane mirror that reflects light having a wavelength of 1064 nm and transmits light having a wavelength of 808 nm was used. For the support 34, a plano-convex lens of which a radius of curvature of the first surface 34$a$ was 52 mm was used. A central portion of the first surface 34$a$ of the support 34 was partially coated with a dielectric multilayer film that functions as an HR coat for the light having a wavelength of 1064 nm as the second reflection part 35. Regions in the first surface 34$a$ other than the second reflection part 35 were subjected to the AR-coating. When seen in the Z-axis direction, a shape of the second reflection part 35 was a circle with a diameter of 2 mm. The resonator length Lc was 10 mm.

In the above-described configuration, the magnification m in the unstable resonator corresponds to $2^{1/2}$.

A convex lens was used as the lens 36 for parallelizing the donut beam (the pulsed laser light L2). A lens (having a focal length of 300 mm) was used as the condensing optical system 4.

In the reference experimental example, pulse energy and a pulse width of the pulsed laser light L2 were measured. The pulse energy was measured using a pyroelectric energy sensor (manufactured by Ophir Optronics Solutions Ltd.). The pulse width was measured using a photodetector with a rise time of 30 ps and an oscilloscope of 13 GHz. The pulse energy and the pulse width were measured without using the condensing optical system 4. The pulse energy obtained by the measurement was 13.2 mJ at a repetition frequency of 10 Hz, and the pulse width was 476 ps in full width at half maximum.

In the reference experimental example, beam quality ($M^2$) in the vicinity of the condensing position of the condensing optical system 4 was measured. For the measurement of the beam quality, a beam quality $M^2$ tool (manufactured by Cinogy technologies GmbH) according to ISO11146 and analysis software (RayCi) were used.

Figure 3:
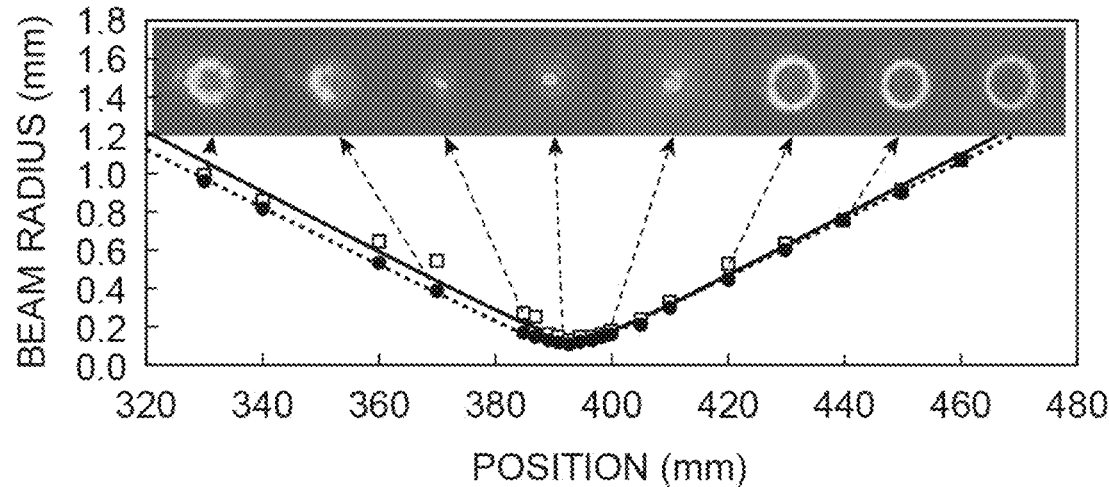
FIG. 3 is a view showing a measurement result of a beam diameter in a reference experimental example.

The beam quality ($M^2$) was obtained as follows. A beam diameter was measured at a plurality of positions before and after the condensing position in a propagation direction of the donut beam. $M^2$ was calculated from measurement results thereof. The measurement results of the beam diameter were as shown in FIG. 3. A horizontal axis in FIG. 3 indicates a position (mm) at which the beam diameter is measured, and a vertical axis indicates a donut beam radius. FIG. 3 shows the radius of the donut beam in an X-axis direction and a Y-axis direction in a three-dimensional coordinate system set with respect to the Z-axis. Each of square marks in FIG. 3 is the radius of the beam in the X-axis direction, and each of black circle marks is the radius of the beam in the Y-axis direction. The donut beam is theoretically a perfect circle, but actually has a slightly elliptical shape. The X-axis corresponds to a major axis direction of the ellipse, and the Y-axis corresponds to a minor axis direction of the ellipse. FIG. 3 also shows a beam pattern at each measurement position. As shown in FIG. 3, a fur-field pattern at the focal position was an Airy disk and an Airy pattern.

The $M^2$ calculated from FIG. 3 was 6.8 in the X-axis direction and 5.3 in the Y-axis direction. A numerical value of $M^2$ in the reference experimental example is a value based on the secondary moment beam diameter. In addition, $M^2_{PC}$ based on a beam diameter of 86.5% of optical power was also calculated. The $M^2_{PC}$ in each of the X-axis direction and the Y-axis direction was 6.5 and 5.2. Here, an average $M^2_{ave}$ of $M^2$ in the X-axis direction and the Y-axis direction is defined by the following Equation.

$$M_{ave}{}^2 = \sqrt{M_X{}^2 M_Y{}^2} \qquad \text{[Math. 1]}$$

In this case, the average $M^2_{ave}$ of $M^2$ calculated in the X-axis direction and the Y-axis direction was 6. Similarly, the average $M^2_{ave}$ of $M^2_{PC}$ calculated in the X-axis direction and the Y-axis direction was 5.8.

Figure 4:
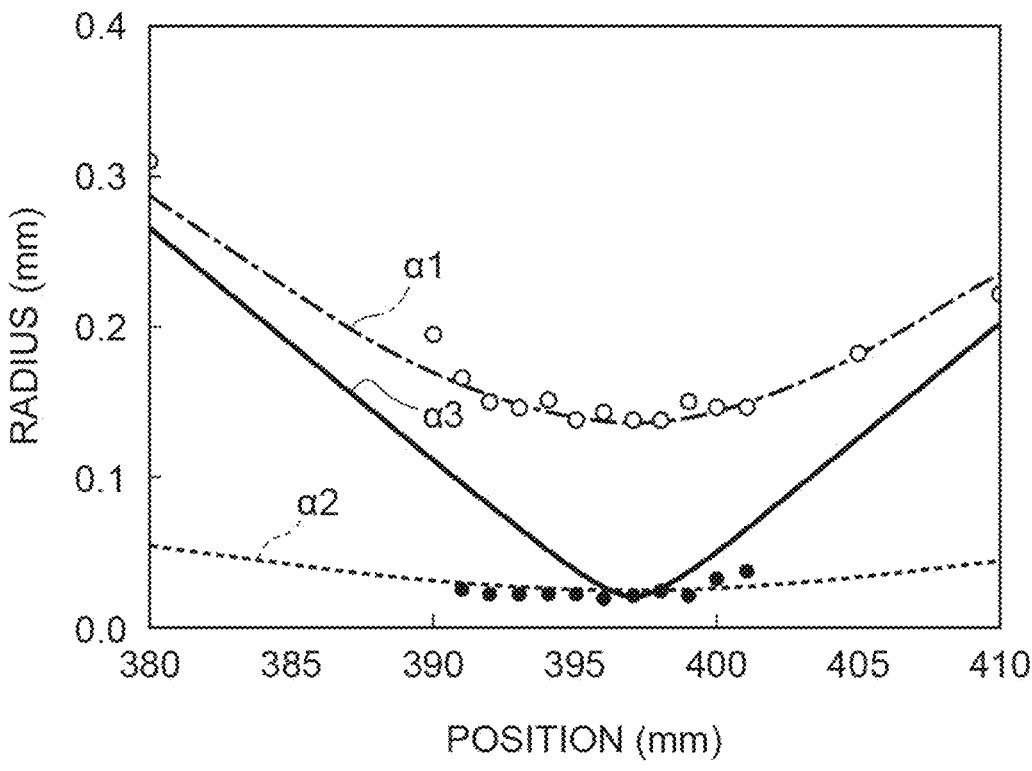
FIG. 4 is a graph in which a beam radius of a donut beam (pulsed laser light) near a focal point and a radius of an Airy disk of the donut beam are plotted in the reference experimental example.

FIG. 4 is a graph in which the beam radius of the donut beam in the vicinity of the focal point and the radius of the Airy disk of the donut beam are plotted. The beam radius of the donut beam is an average value of the radii in the X-axis direction and the Y-axis direction shown in FIG. 3. A curve $\alpha 1$ in FIG. 4 shows a fitting curve with respect to the measurement result of the beam radius of the donut beam. A curve $\alpha 2$ in FIG. 4 shows a fitting curve with respect to the measurement result of the Airy disk radius. Further, a curve $\alpha 3$ in FIG. 4 shows a Gaussian beam radius when a Gaussian beam is condensed by the same lens.

From the results shown in FIG. 4, the radius of the Airy disk was about 0.2 times the beam radius of the donut beam. Here, a width and beam quality of the Airy disk are indicated by $w_{Airy}$ and $M^2_{Airy}$, and a width and beam quality of the donut beam are indicated by $w_d$ and $M^2_d$. In this case, the following relationship is established.

$$\frac{w_{Airy}}{w_d} = \frac{M^2_{Airy}}{M^2_d} \qquad \text{[Math. 2]}$$

As described above, $M^2_d$ is 6, and $w_{Airy}/w_d$ is about 0.2. Therefore, the beam quality $M^2$ of the entire donut beam is 6, while the beam quality of about 1.2 can be obtained in the Airy disk. In other words, the Airy disk provides the beam quality close to that of Gaussian mode.

Further, when focusing on a region corresponding to the Airy disk of the donut beam in FIG. 4, a long Rayleigh length (about four times that of the Gaussian beam in FIG. 4) can be realized.

Figure 5:
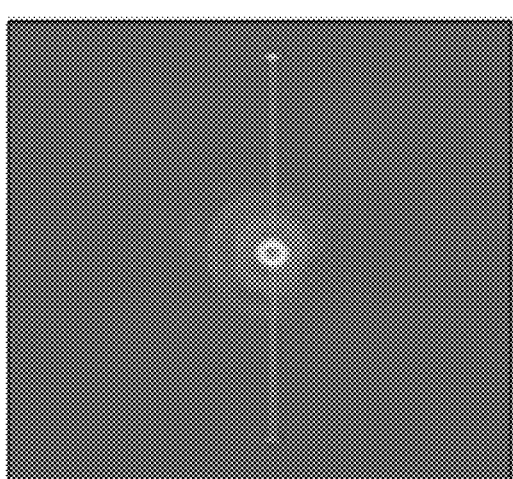
FIG. 5 is an image of a beam pattern at a focal position in the reference experimental example.

FIG. 5 is an image of the beam pattern at the focal position. It can be understood from FIG. 5 that the Airy disk and the Airy pattern are formed at the focal position.

Figure 6:
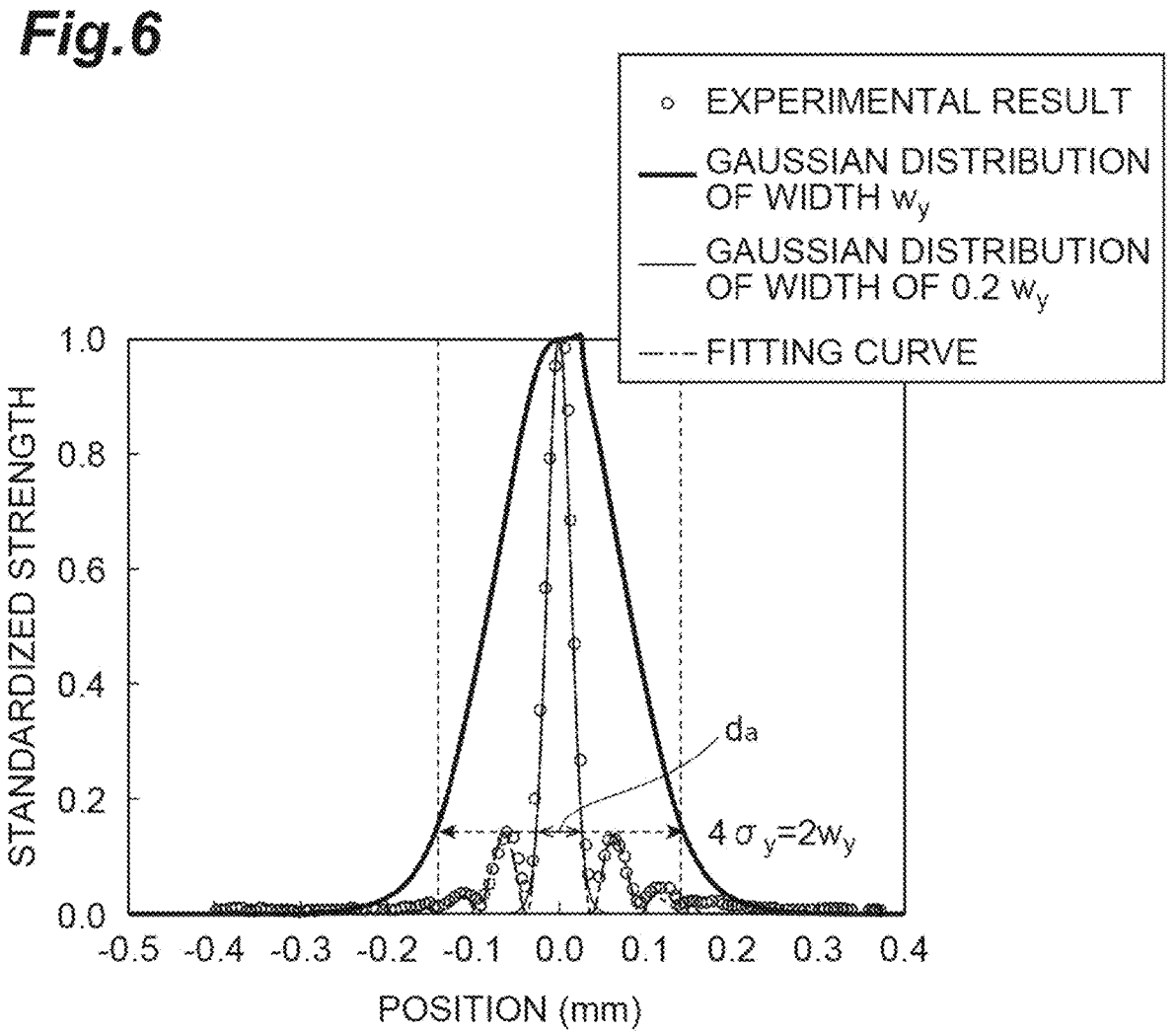
FIG. 6 is a view showing an intensity distribution in a y-axis direction when a white line shown in FIG. 5 is taken as a y-axis.

FIG. 6 is a view showing the intensity distribution in the y-axis direction when the white line shown in FIG. 5 (the white line that extends in a vertical direction in FIG. 6) is taken as the y-axis. In FIG. 6, the intensities (experimental results) of cross sections in the y-axis direction in the central portion of FIG. 5 are plotted with white circles. A horizontal axis in the drawing indicates a position in the y-axis direction, and a vertical axis indicates standardized strength. The secondary moment beam diameter ($2w_y$) of the Airy disk and the Airy pattern was 0.29 mm. In FIG. 6, a Gaussian distribution having the same beam diameter (0.29 mm) is shown by a solid line, and a Gaussian distribution having a diameter of $0.2w_y$ is shown by a broken line. A width $w_y$ is a width of a positive (or negative) region with respect to a position 0. A length da shown in FIG. 6 corresponds to the diameter of the Airy disk.

When a plane wave passes through a circular aperture lens, an Airy disk pattern is generated by a diffraction. Therefore, the intensity distribution of the donut beam was fitted by Equation (1) (for example, referring to B. Lu, et al., "The beam quality of annular lasers and related problems," J. Mod. Opt. 48, 1171 (2001)) showing an intensity distribution at a condensing position (a focal position) of light when the plane wave was condensed by the circular aperture lens.

[Math. 3]

$$I(r, f) = \frac{4\, I(0, f)}{\left(1 - 1/m^2\right)^2}\left[\frac{J_1(krb/f)}{krb/f} - \frac{1}{m^2}\frac{J_1(kra/f)}{kra/f}\right]^2 \qquad (1)$$

m in Equation (1) is b/a. In Equation (1), b which defines m is an outer radius of the circular aperture lens, and a is an inner radius of a circular aperture. f is a focal length of the circular aperture lens. r is a position in a radial direction of the Airy disk at the focal position. $I(0, f)$ is a peak intensity at the focal plane. $I(0, f)$ is indicated by $S^2/(\lambda^2 f^2)$. S is an aperture area of the circular aperture lens. S is indicated by $\pi a^2(m^2-1)$. $J_1$ is the first order Bessel function. k $(=2\pi/\lambda)$ is a wave number.

In a fitting curve shown in FIG. 6, m, 2b and f were as follows.

m=1.48

2b=7.5 mm f=315 mm

The magnification m of the unstable resonator in the reference experiment is $2^{1/2}$. Therefore, the fitting results based on Equation (1) allows the intensity distribution of the Airy disk at the focal position of the donut beam (the pulsed laser light L2) to be calculated based on Equation (1) by regarding m in Equation (1) as a magnification of the unstable resonator (in other words, $d_i=2a$ and $d_o=2b$).

Returning to FIG. 1, the laser device 1A will be further described.

In the present embodiment, when a power of the excitation light L1 (hereinafter, also referred to as "excitation power") is $P_p$ (kW), the magnification m satisfies the following Equation (2a). In other words, the unstable resonator UR (specifically, the first reflection part 33 and the second reflection part 35) is designed so that the magnification m satisfies Equation (2a).

$$a_0 + a_1\,\text{Log}(P_p) \leq m \leq b_0 + b_1 P_p + b_2 P_p{}^2 \qquad (2a)$$

where $a_0$, $a_1$, $b_0$, $b_1$, and $b_2$ in Equation (2a) are as follows.

$a_0$=1.421

$a_1$=0.10678

$b_0$=2.8698

$b_1$=0.79408

$b_2$=−0.022536

The magnification m may satisfy the following Equation (2b). In other words, the unstable resonator UR (specifically, the first reflection part 33 and the second reflection part 35) may be designed so that the magnification m satisfies Equation (2b).

$$a_0 + a_1\,\text{Log}(P_p) \leq m \leq b_0 + b_1 P_p + b_2 P_p{}^2 \qquad (2b)$$

where $a_0$, $a_1$, $b_0$, $b_1$, and $b_2$ in Equation (2b) are as follows.

$a_0$=1.613

$a_1$=0.16827

$b_0$=2.6961

$b_1$=0.71522

$b_2$=−0.023234

The magnification m may satisfy the following Equation (2c). In other words, the unstable resonator UR (specifically, the first reflection part 33 and the second reflection part 35) may be designed so that the magnification m satisfies Equation (2c).

$$a_0 + a_1 \, \mathrm{Log}(P_p) \leq m \leq b_0 + b_1 P_p + b_2 P_p^2 \qquad (2c)$$

where $a_0$, $a_1$, $b_0$, and $b_1$ in Equation (2c) are as follows.
$a_0 = 1.886$
$a_1 = 0.28888$
$b_0 = 2.6771$
$b_1 = 0.51375$
$b_2 = -0.021411$ The magnification m may satisfy the following Equation (2d). In other words, the unstable resonator UR (specifically, the first reflection part 33 and the second reflection part 35) may be designed so that the magnification m satisfies Equation (2d).

$$a_0 + a_1 \, \mathrm{Log}(P_p) \leq m \leq b_0 + b_1 P_p + b_2 P_p^2 \qquad (2d)$$

where $a_0$, $a_1$, $b_0$, and $b_1$ in Equation (2d) are as follows.
$a_0 = 1.9308$
$a_1 = 0.37083$
$b_0 = 2.9116$
$b_1 = 2.3422$ Specifically, the magnification m is larger than $2^{1/2}$. The magnification m is, for example, 10 or less. The magnification may be 7 or less, 6 or less, 5 or less, or 4 or less.

[When the excitation power $P_p$ is 1.5 kW or more and 12 kW or less (or 3 kW or less or 6 kW or less) (particularly when it is 1.5 kW)]

The magnification m may be 1.44 or more and 4.01 or less.

The magnification m may be 1.64 or more and 3.72 or less.

The magnification m may be 1.93 or more and 3.40 or less.

The magnification m may be 1.99 or more and 3.32 or less.

[When the excitation power $P_p$ is 3 kW or more and 12 kW or less (or 6 kW or less) (particularly when it is 3 kW)]

The magnification m may be 1.47 or more and 5.1 or less.

The magnification m may be 1.69 or more and 4.64 or less.

The magnification m may be 2.02 or more and 4.03 or less.

The magnification m may be 2.10 or more and 4.03 or less.

[When the excitation power $P_p$ is 6 kW or more and 12 kW or less (particularly when it is 6 kW)]

The magnification m may be 1.50 or more and 6.82 or less.

The magnification m may be 1.74 or more and 6.20 or less.

The magnification m may be 2.11 or more and 4.99 or less.

The magnification m may be 2.22 or more and 4.74 or less.

[When the excitation power $P_P$ is 12 kW]

The magnification m may be 1.53 or more and 9.16 or less.

The magnification m may be 1.79 or more and 7.94 or less.

The magnification m may be 2.19 or more and 5.76 or less.

The magnification m may be 2.33 or more and 5.44 or less.

In the laser device 1A, when excitation light L1 is input to the optical oscillator 3A, donut-shaped pulsed laser light L2 is output. The laser device 1A has the condensing optical system 4. Therefore, the pulsed laser light L2 is condensed by the condensing optical system 4.

Energy contained in a center of the pulsed laser light L2 as the Airy disk at a condensing position (a focal position) of the condensing optical system 4 is referred to as "effective energy". In the laser device 1A, the magnification m satisfies Equation (2). Therefore, it is possible to realize high effective energy with respect to the energy of the excitation light L1. Therefore, the laser device 1A and the optical oscillator 3A are effective in the field of laser application in which laser light is condensed and used.

A size of the Airy disk is smaller than a size of the pulsed laser light L2. Since high effective energy can be realized in the region of the Airy disk, for example, microfabrication and surgery in a fine region are also possible. At the condensing position, since the energy of the pulsed laser light L2 is contained more in the Airy disk, and a depth of focus corresponding to the Rayleigh length is also long, a stable breakdown can be expected.

Next, the fact that high effective energy can be realized with respect to the energy of the excitation light L1 will be further described with reference to the numerical calculation results.

Figure 7:
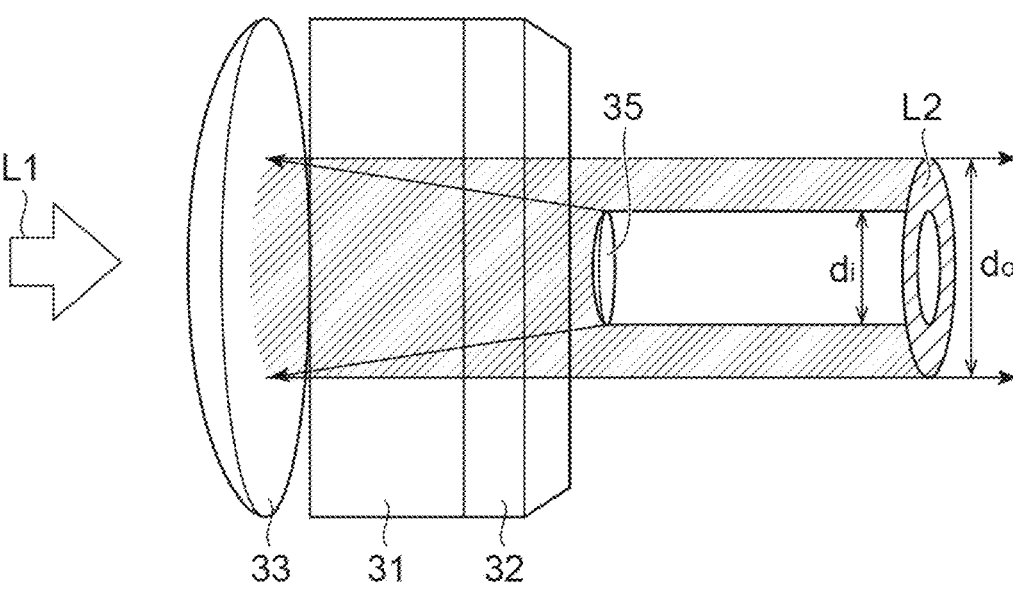
FIG. 7 is a schematic view showing a model of an optical oscillator used for a numerical calculation.

FIG. 7 is a schematic view showing a model of the optical oscillator used for the numerical calculation. As shown in FIG. 7, the optical oscillator as a numerical calculation model includes the first reflection part 33, the laser medium 31, the Q-switch element 32, and the second reflection part 35. In the numerical calculation, it is assumed that the excitation light L1 is input to the optical oscillator and the pulsed laser light L2 having a magnification m ($=d_o/d_i$) is output.

A shape and size of the excitation light L1, and a diameter and reflectance of the second reflection part 35 were assumed as follows.

Shape of excitation light L1 (shape seen in the Z-axis direction): circular

Size (diameter) of the excitation light L1: diameter $d_o$ of the pulsed laser light L2 to be output was used.

Diameter $d_i$ of second reflection part 35: 1 mm

Reflectance (or coupling efficiency) of second reflection part 35: $1/m^2$

Further, an effective mode area ($A_g$) of the laser medium 31 and an effective mode area ($A_{SA}$) of the Q-switch element 32 were set to be the same.

In the numerical calculation, when the output pulsed laser light L2 was condensed by the lens, a ratio of the effective energy $E_{Airy \, disk}$ to the energy $E_{pump}$ of the excitation light L1 (hereinafter, referred to as "effective energy conversion efficiency $\eta_{eff}$") was calculated. The effective energy $E_{Airy \, disk}$ is energy in the Airy disk at a condensing position of the pulsed laser light L2, as described above.

The following Equations (3) and (4) were used for the above calculation (refer to, for example, Reference Literatures 1 to 3 below). $E_{pulse}$ indicated by Equation (4) is the energy of the pulsed laser light L2.

[Math. 4]

$$E_{Pump} \cong P_p \tau_g \left[ \ln \left( \frac{W_p \tau_g}{W_p \tau_g - n_{gi}} \right) \right] \qquad (3)$$

-continued

[Math. 5]

$$E_{pulse} \cong \frac{hvA_g}{2\gamma_g \sigma_g} \ln\left(\frac{1}{R}\right) \ln\left(\frac{n_{gi}}{n_{gf}}\right) \quad (4)$$

where $n_{gi}$ in Equations (3) and (4) is an initial population inversion density of the laser medium 31 (an initial population inversion density of gain medium) indicated by Equation (5).

[Math. 6]

$$n_{gi} \cong \frac{\ln\left(\frac{1}{T_0^2}\right) + \ln\left(\frac{1}{R}\right) + L}{2\sigma_g l_g} \quad (5)$$

Each parameter in Equations (3) to (5) is as follows.
$T_0$: Initial transmittance of Q-switch element
R: Reflectance corresponding to diffraction loss of the second reflection part 35
L: Reciprocating loss in unstable resonator UR
$\sigma_g(m^2)$: Induced release cross-sectional area
$l_g(mm)$: Length of laser medium 31
$A_g(=\pi(d_o/2)^2)$: Mode area in laser medium 31
$\gamma_g$: Population inversion reducing factor of laser medium 31
$n_{gf}$: Final population inversion of laser medium 31
$P_p$: Peak power of excitation light L1
$\tau_g(ms)$: Upper level life
$W_p$: Excitation rate
Reference Literature 1: N. Pavel, J. Saikawa, S. Kurimura, and T. Taira, "High average power diode end-pumped composite Nd:YAG laser passively Q-switched by Cr4+: YAG saturable absorber," Jpn. J. Appl. Phys. 40 (Part 1, No. 3A), 1253-1259 (2001).
Reference Literature 2: H Sakai, H Kan, T Taira, "1 MW peak power single-mode high-brightness passively Q-switched Nd$^{3+}$:YAG microchip laser Optics Express; Vol. 16, Issue 24, pp. 19891-19899, (2008).
Reference Literature 3: A. Kausas and T. Taira, "Giant-pulse Nd:YVO4 microchip laser with MW-level peak power by emission cross-sectional control," Opt. Express 24(4), 3137-3149(2016).

In the numerical calculation, $T_0$, R, L, $\sigma_g$, $l_g(mm)$, $\gamma_g$, and $\tau_g$ were taken as the following values.
$T_0=0.3$
$R=0.5$
$L=0.06$
$\sigma_g=2.63\times10^{-23}$ $(m^2)$
$l_g=4$ mm,
$\gamma_g=2$
$\tau_g=0.23$ ms
$n_{gf}$ was sequentially calculated in the numerical calculation process. $W_p$ was determined by the excitation power $P_p$ and an excitation area thereof.

Further, the energy $E_{Airy\ disk}$ in the Airy disk was calculated based on the intensity distribution calculated based on Equation (1). When Equation (1) is used, m in Equation (1) is taken as the magnification m. Specifically, a in Equation (1) was set to $d_i/2$, and b in Equation (1) was set to $d_o/2$.

A ratio of the energy Epi, of the pulsed laser light L2 to the energy $E_{PUMP}$ of the excitation light L1 is referred to as energy conversion efficiency $\eta$.

A ratio of the effective energy $E_{Airy\ disk}$ in the energy $E_{pulse}$ of the pulsed laser light L2 is referred to as effective energy rate $E_{eff}$.

A ratio of the energy $E_{pulse}$ of the pulsed laser light L2 to the energy $E_{PUMP}$ of the excitation light L1 is referred to as effective energy conversion efficiency $\eta_{eff}$.

The energy conversion efficiency $\eta$, the effective energy rate $E_{eff}$, and the effective energy conversion efficiency eff are expressed by the following Equations, respectively.

[Math. 7]

$$\eta = \frac{E_{pulse}}{E_{pump}} \quad (6a)$$

$$E_{eff} = \frac{E_{Airy\ disk}}{E_{pulse}} \quad (6b)$$

$$\eta_{eff} = \frac{E_{Airy\ disk}}{E_{pump}} \quad (6c)$$

The energy conversion efficiency $\eta$, the effective energy rate $E_{eff}$ and the effective energy conversion efficiency $\eta_{eff}$ were calculated for various magnifications m when the excitation power Pp was 1.5 kW, 3 kW, 6 kW and 12 kW. The magnification m was adjusted by fixing $d_i$ (corresponding to the inner diameter of the pulsed laser light L2) and changing $d_o$ (corresponding to the outer diameter of the pulsed laser light L2). The calculation results are as shown in FIGS. 8 and 9.

Figure 8:
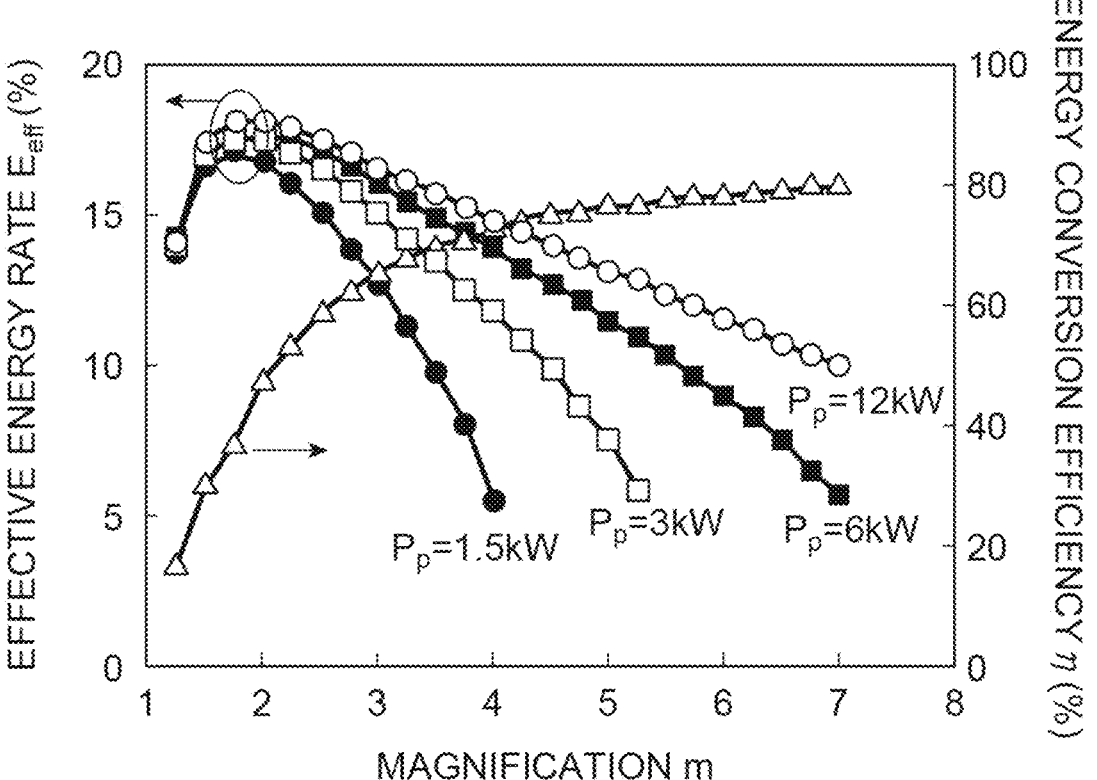
FIG. 8 is a graph showing magnification dependence of energy conversion efficiency $\eta$ and an effective energy rate $E_{eff}$.

FIG. 8 is a graph showing magnification dependence of the energy conversion efficiency $\eta$ and the effective energy rate $E_{eff}$. A horizontal axis of FIG. 8 shows the magnification. In FIG. 8, a vertical axis on the right side shows the energy conversion efficiency $\eta$, and a vertical axis on the left side shows the energy conversion efficiency $\eta$. FIG. 9 is a graph showing the magnification dependence (conversion efficiency distribution) of the effective energy conversion efficiency $\eta_{eff}$. A horizontal axis of FIG. 9 shows the magnification. A vertical axis of FIG. 9 shows the effective energy conversion efficiency $\eta_{eff}$. FIG. 9 is the product of the effective energy rate $E_{eff}$ and the energy conversion efficiency $\eta$ shown in FIG. 8, as can be understood from Equation (6c).

Figure 9:
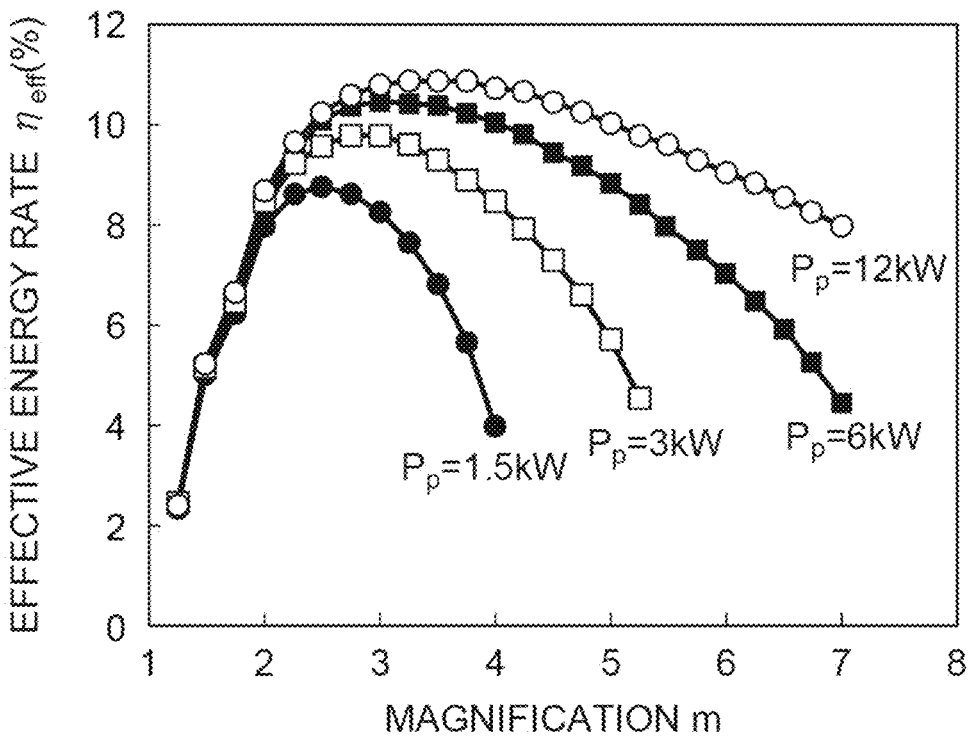
FIG. 9 is a graph showing the magnification dependence of the effective energy conversion efficiency $\eta_{eff}$.
Figure 10:
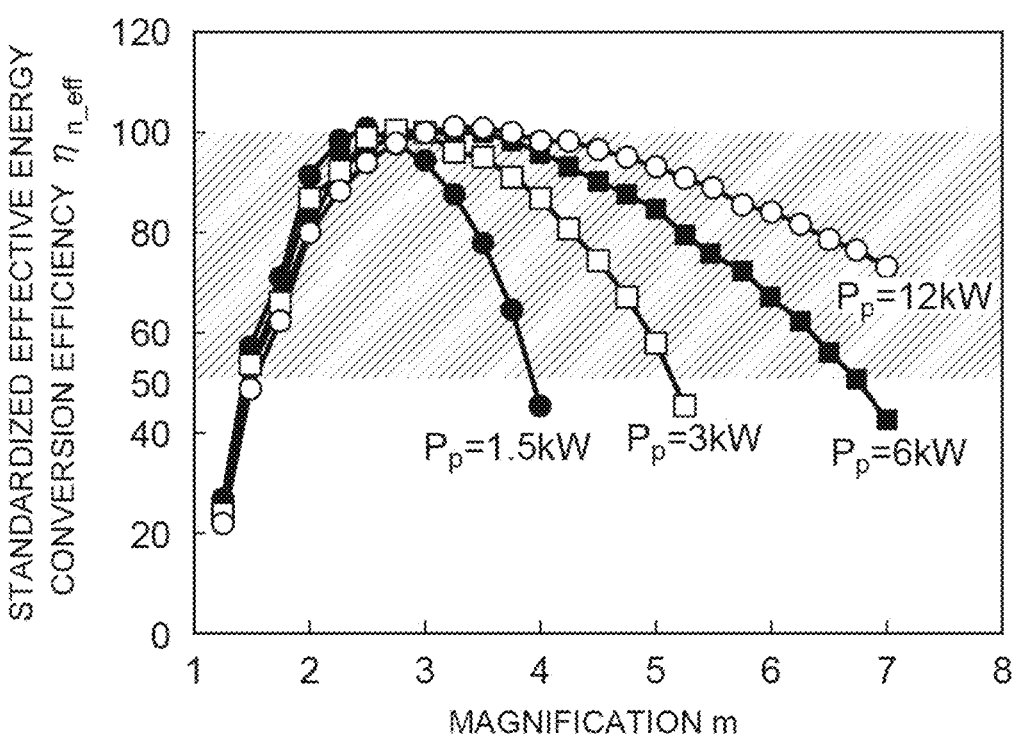
FIG. 10 is a graph showing the magnification dependence of standardized effective energy conversion efficiency $\eta_{eff}$.

Further, standardized effective energy conversion efficiency $\eta_{n\_eff}$ was calculated by standardizing the magnification dependence of the effective energy conversion efficiency $\eta_{eff}$ shown in FIG. 9 by maximum effective energy conversion efficiency (a maximum value) of the effective energy conversion efficiency $\eta_{eff}$. The standardized effective energy conversion efficiency $\eta_{n\_eff}$ was calculated for the magnification dependence of the effective energy conversion efficiency $\eta_{eff}$ of the excitation power $P_p$ of each excitation light L1. The results were as shown in FIG. 10. A horizontal axis of FIG. 10 is the magnification m, and a vertical axis is the standardized effective energy conversion efficiency $\eta_{n\_ef}$.

A hatched region in FIG. 10 indicates a region in which the standardized effective energy conversion efficiency $\eta_{n\_eff}$ is 50% or more. The relationship between the magnification m with respect to the hatched region and the excitation power $P_p$ is expressed by Equation (2a).

Therefore, when the magnification m satisfies Equation (2a), the standardized effective energy conversion efficiency $\eta_{n\_eff}$ of 50% or more can be obtained. That is, the energy of the excitation light L1 can be efficiently converted into the effective energy. As a result, high effective energy can be realized.

Equation (2b) shows a region in which the standardized effective energy conversion efficiency $\eta_{n\_eff}$ is 63.21% or more. Therefore, when the magnification m satisfies Equation (2b), the standardized effective energy conversion efficiency $\eta_{n\_eff}$ of 63.21% or more can be obtained. That is, the energy of the excitation light L1 can be more efficiently converted into effective energy. As a result, higher effective energy can be realized.

Equation (2c) shows a region in which the standardized effective energy conversion efficiency $\eta_{n\_eff}$ is 86.47% or more. Therefore, when the magnification m satisfies Equation (2c), the standardized effective energy conversion efficiency $\eta_{n\_eff}$ of 86.47% or more can be obtained. That is, the energy of the excitation light L1 can be more efficiently converted into effective energy. As a result, higher effective energy can be realized.

Equation (2d) shows a region in which the standardized effective energy conversion efficiency $\eta_{n\_eff}$ is 90% or more. Therefore, when the magnification m satisfies Equation (2d), the standardized effective energy conversion efficiency $\eta_{n\_eff}$ of 90% or more can be obtained. That is, the energy of the excitation light L1 can be more efficiently converted into effective energy. As a result, higher effective energy can be realized.

The following facts can also be understood from FIG. 10.

[When the excitation power $P_p$ is 1.5 kW or more and 12 kW or less (or 3 kW or less or 6 kW or less) (particularly when it is 1.5 kW)]

When the magnification m is 1.44 or more and 4.01 or less, the standardized effective energy conversion efficiency $\eta_{n\_eff}$ of 50% or more can be realized.

When the magnification m is 1.64 or more and 3.72 or less, the standardized effective energy conversion efficiency $\eta_{n\_eff}$ of 63.21% or more can be realized.

When the magnification m is 1.93 or more and 3.40 or less, the standardized effective energy conversion efficiency $\eta_{n\_eff}$ of 86.47% or more can be realized.

When the magnification m is 1.99 or more and 3.32 or less, the standardized effective energy conversion efficiency $\eta_{n\_eff}$ of 90% or more can be realized.

The following facts can also be understood from FIG. 10.

[When the excitation power $P_p$ is 3 kW or more and 12 kW or less (or 6 kW or less) (particularly when it is 3 kW)]

When the magnification m is 1.47 or more and 5.1 or less, the standardized effective energy conversion efficiency $\eta_{n\_eff}$ of 50% or more can be realized.

When the magnification m is 1.69 or more and 4.64 or less, the standardized effective energy conversion efficiency $\eta_{n\_eff}$ of 63.21% or more can be realized.

When the magnification m is 2.02 or more and 4.03 or less, the standardized effective energy conversion efficiency $\eta_{n\_eff}$ of 86.47% or more can be realized.

When the magnification m is 2.10 or more and 4.03 or less, the standardized effective energy conversion efficiency $\eta_{n\_eff}$ of 90% or more can be realized.

The following facts can also be understood from FIG. 10.

[When the excitation power $P_p$ is 6 kW or more and 12 kW or less (particularly when it is 6 kW)]

When the magnification m is 1.50 or more and 6.82 or less, the standardized effective energy conversion efficiency $\eta_{n\_eff}$ of 50% or more can be realized.

When the magnification m is 1.74 or more and 6.20 or less, the standardized effective energy conversion efficiency $\eta_{n\_eff}$ of 63.21% or more can be realized.

When the magnification m is 2.11 or more and 4.99 or less, the standardized effective energy conversion efficiency $\eta_{n\_eff}$ of 86.47% or more can be realized.

When the magnification m is 2.22 or more and 4.74 or less, the standardized effective energy conversion efficiency $\eta_{n\_eff}$ of 90% or more can be realized.

The following points can also be understood from FIG. 10.

[When the excitation power $P_p$ is 12 kW]

When the magnification m is 1.53 or more and 9.16 or less, the standardized effective energy conversion efficiency $\eta_{n\_eff}$ of 50% or more can be realized.

When the magnification m is 1.79 or more and 7.94 or less, the standardized effective energy conversion efficiency $\eta_{n\_eff}$ of 63.21% or more can be realized.

When the magnification m is 2.19 or more and 5.76 or less, the standardized effective energy conversion efficiency $\eta_{n\_eff}$ of 86.47% or more can be realized.

When the magnification m is 2.33 or more and 5.44 or less, the standardized effective energy conversion efficiency $\eta_{n\_eff}$ of 90% or more can be realized.

When the optical oscillator 3A included in the laser device 1A is designed, for example, the following design method is possible.

First, the standardized effective energy conversion efficiency $\eta_{n\_eff}$ is calculated by the same method as the above-described numerical calculation. The magnification m is set so that the standardized effective energy conversion efficiency is 50% or more. The shapes and sizes of the first reflection part and the second reflection part are determined to realize the magnification m set in this way. Thus, it is possible to design the optical oscillator 3A capable of realizing the laser device 1A, and as a result, it is possible to design the laser device 1A capable of realizing the standardized effective energy conversion efficiency $\eta_{n\_eff}$ of 50% or more.

Next, various application examples using the laser device disclosed in the present embodiment will be described.

Figure 11:
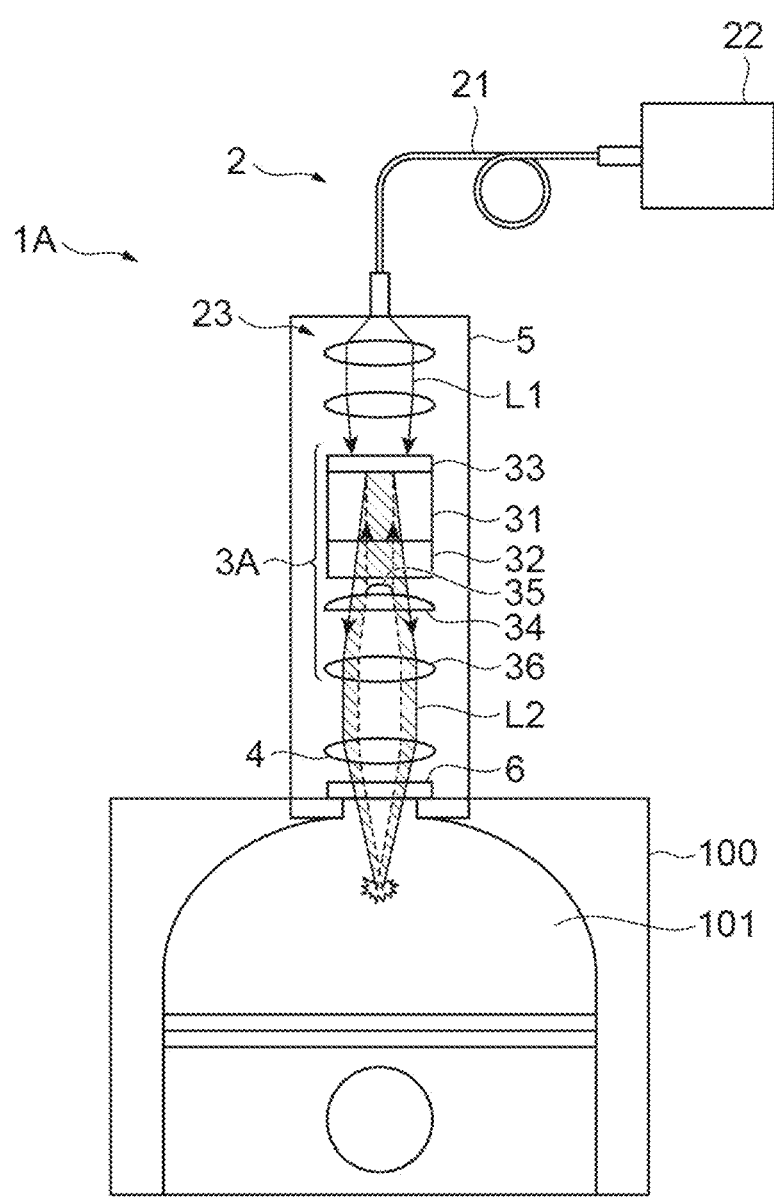
FIG. 11 is a schematic view of a first application example of the laser device.

FIG. 11 is a schematic view of a first application example of the laser device. FIG. 11 shows an example in which the laser device 1A is used for laser ignition of an internal combustion engine 100 in an automobile, cogeneration, or the like. In this case, the laser device 1A is mounted in the internal combustion engine so that the condensing position of the pulsed laser light L2 output from the laser device 1A is located inside a combustion chamber 101 of the internal combustion engine 100. Since the laser device 1A has high effective energy as described above, the laser ignition can be performed efficiently.

Figure 12:
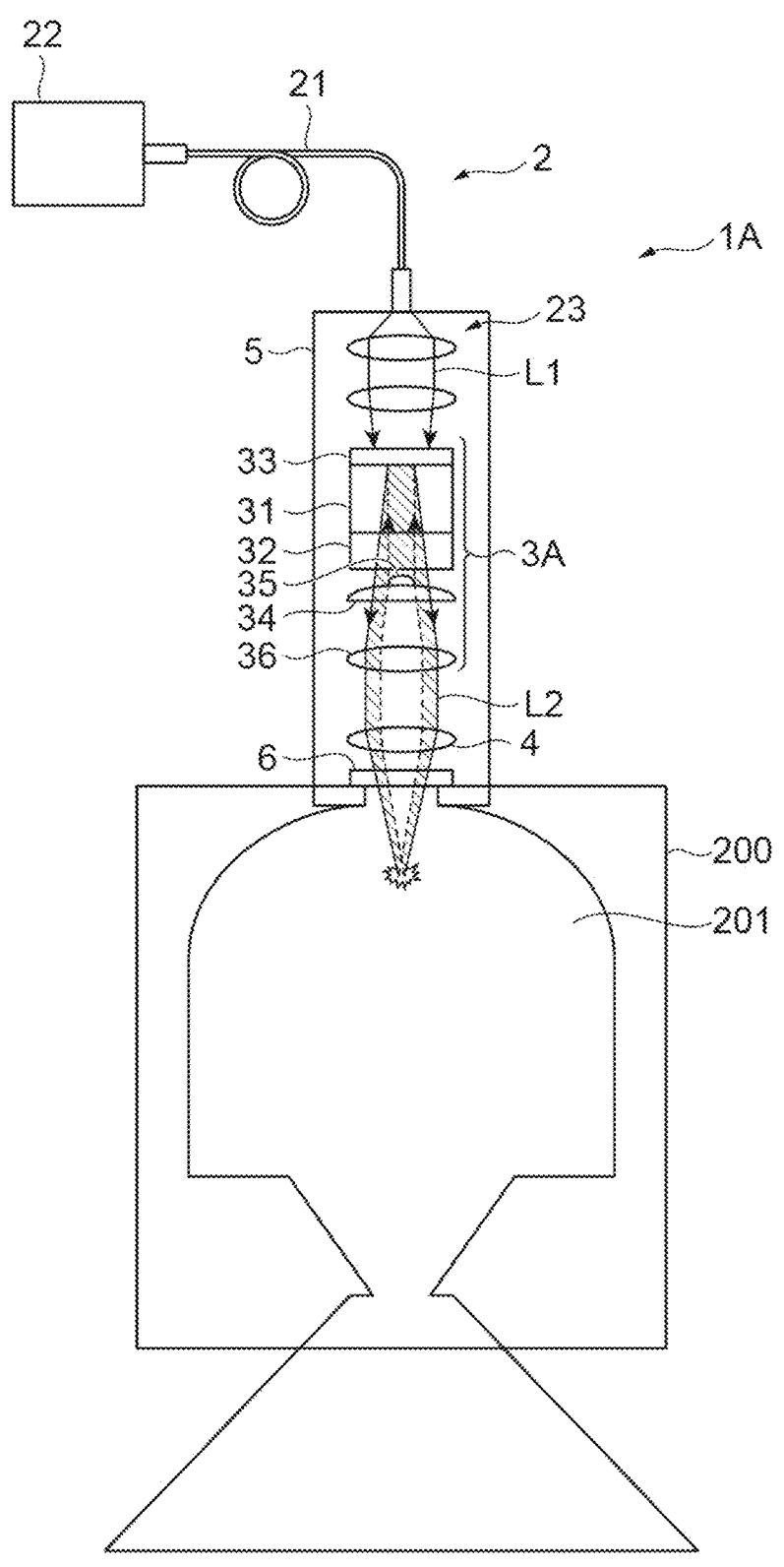
FIG. 12 is a schematic view of a second application example of the laser device.

FIG. 12 is a schematic view of a second application example of the laser device. FIG. 12 shows an example in which the laser device 1A is used for laser ignition of a jet engine 200. In this case, the laser device 1A is mounted in the jet engine 200 so that the condensing position of the pulsed laser light L2 output from the laser device 1A is located inside a combustion chamber 201 of the jet engine 200. Since the laser device 1A has high effective energy as described above, the laser ignition can be performed efficiently.

Figure 13:
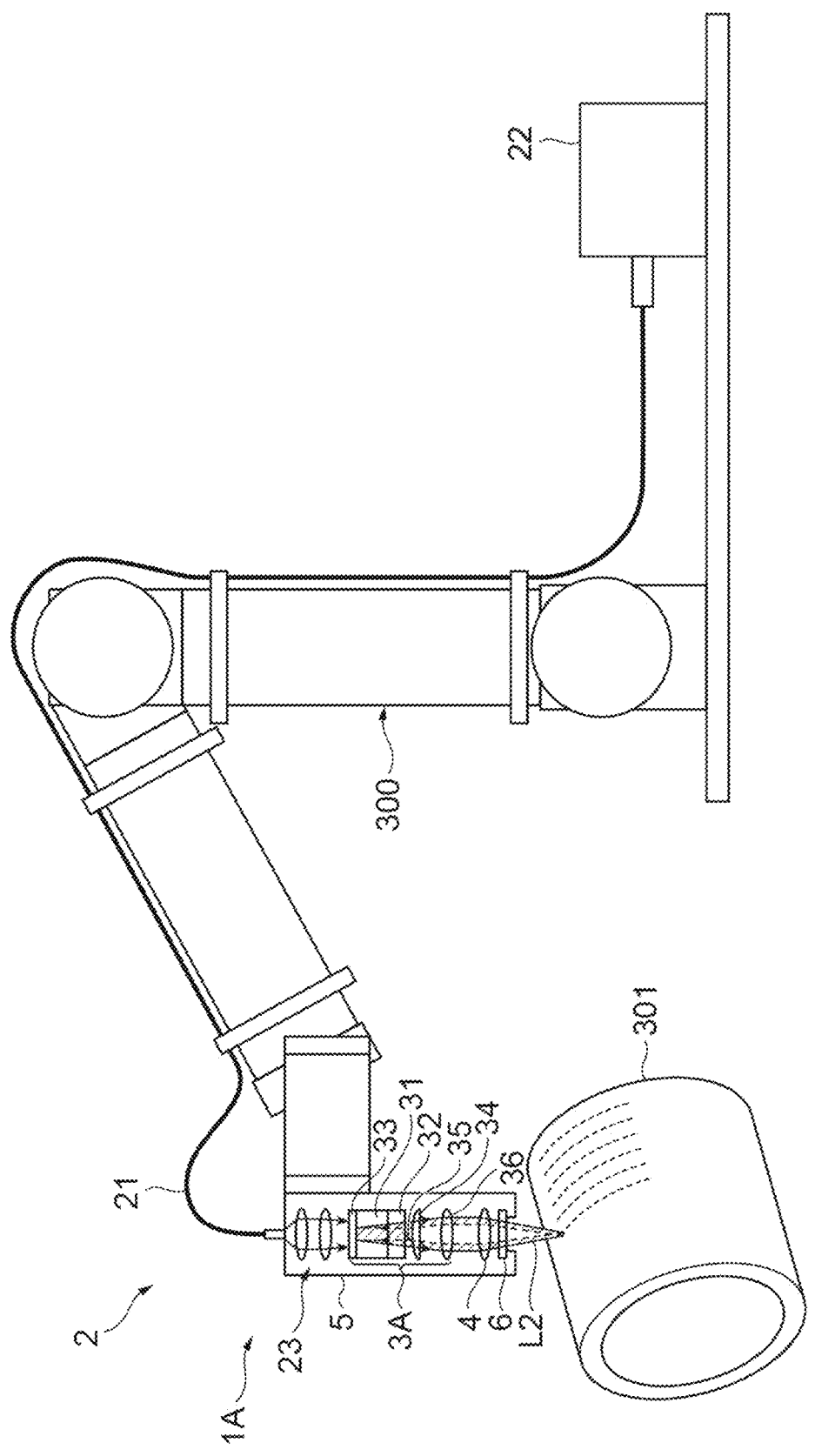
FIG. 13 is a schematic view of a third application example of the laser device.

FIG. 13 is a schematic view of a third application example of the laser device. FIG. 13 shows a case in which the laser device 1A is applied to laser processing such as marking and microfabrication. In the example shown in FIG. 13, the laser device 1A (specifically, the accommodation part 5) is mounted in a robot arm 300. The pulsed laser light L2 can be applied to a processing position of a target object 301 to be processed by operating the robot arm 300. Therefore, the above-described laser processing such as marking and microfabrication can be performed. Since the laser device 1A has high effective energy with respect to the energy of the excitation light L1, the laser processing can be performed efficiently. Further, since the effective energy is the energy in the Airy disk, microfabrication is also possible.

Figure 14:
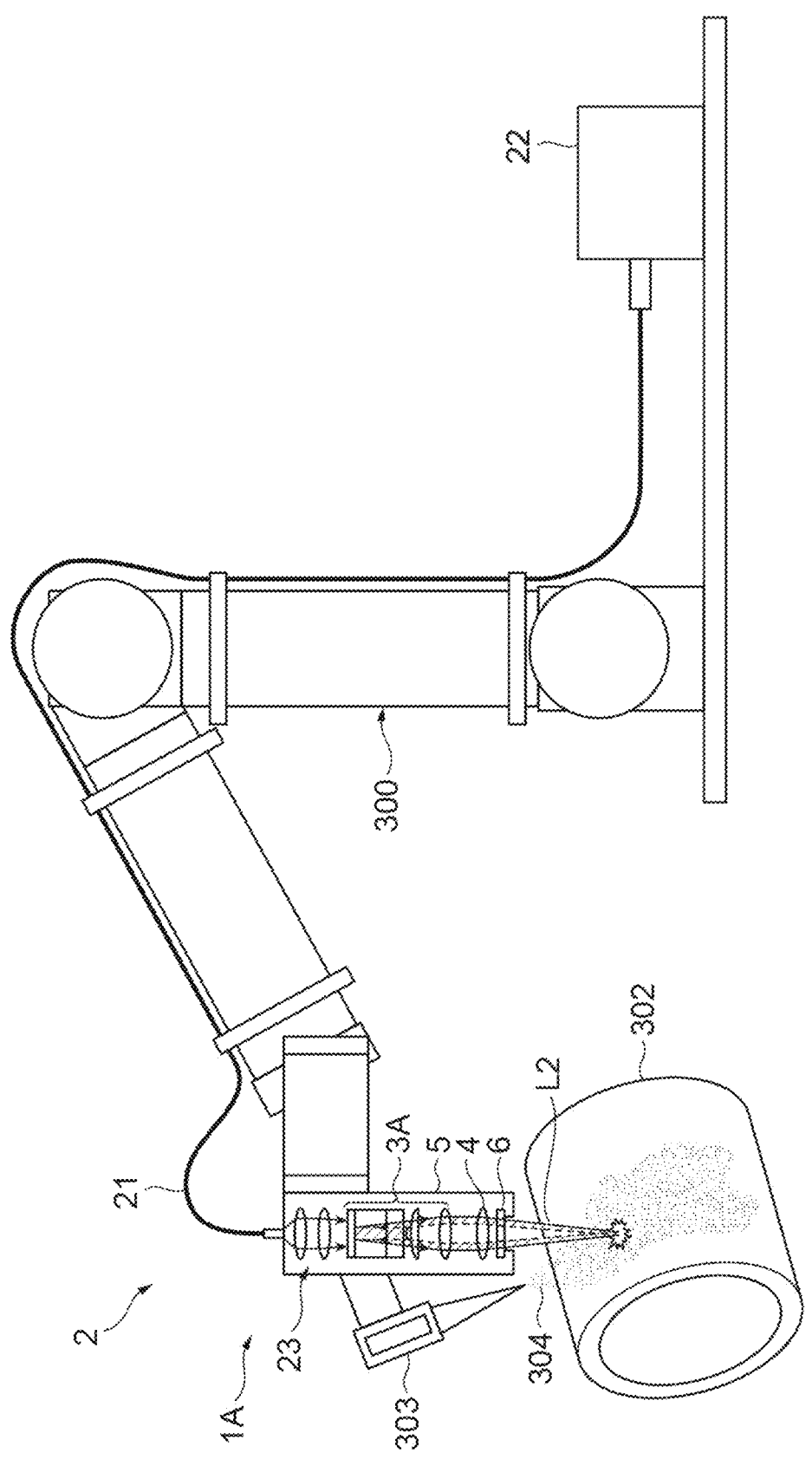
FIG. 14 is a schematic view of a fourth application example of the laser device.

FIG. 14 is a schematic view of a fourth application example. FIG. 14 shows a case in which a target object 302 to be processed is subjected to laser processing such as laser peening processing and laser forming processing. The example shown in FIG. 11 is substantially the same as the third application example shown in FIG. 13 except that a liquid injection part 303 used for the laser peening process, the laser forming process, and the like is mounted in the accommodation part 5. In the example shown in FIG. 14, the above-described laser peening processing and laser forming processing can be performed by irradiating a processing position with the pulsed laser light L2 while a liquid 304 (for example, water) is supplied from the liquid injection part 303 to the processing position of the target object 302. Since the laser device 1A has high effective energy with respect to the energy of the excitation light L1, the laser peening processing, the laser forming processing, and the like can be efficiently performed. Further, since the effective energy is the energy in the Airy disk, microfabrication is also possible.

Figure 15:
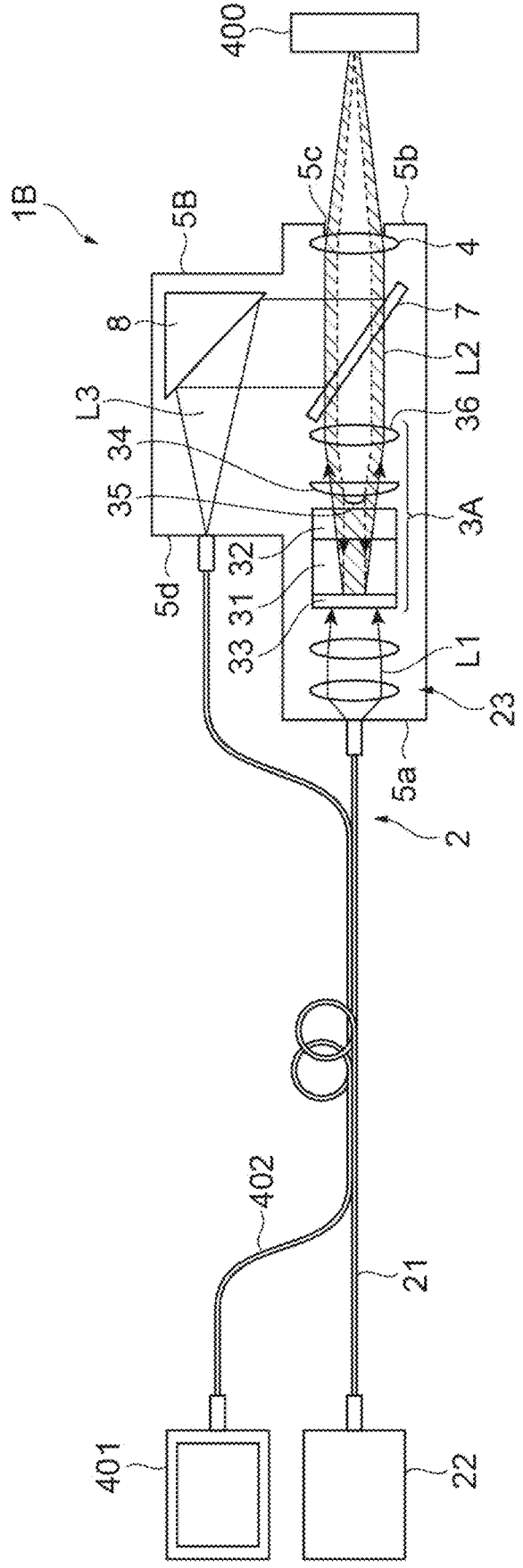
FIG. 15 is a schematic view of a fifth application example of the laser device.

FIG. 15 is a schematic view of a fifth application example. In FIG. 15, a laser device 1B which is a modified example of the laser device is used. FIG. 15 shows an example of when the laser device 1B is applied to the laser-induced breakdown spectroscopy (LIBS) of a sample 400. Light radiated from the laser device 1B and emitted from the sample 400 is referred to as inspection light L3.

The laser device 1B includes an excitation light supply part 2, an optical oscillator 3A, and a condensing optical system 4. Since the excitation light supply part 2, the optical oscillator 3A, and the condensing optical system 4 are the same as in the case of the laser device 1A, the description thereof will be omitted. Also in the fifth application example, the condensing optical system 4 is, for example, a lens. Since the laser device 1B includes the excitation light supply part 2, the optical oscillator 3A, and the condensing optical system 4, the pulsed laser light L2 can be output in the same manner as the laser device 1A. The laser device 1A is disposed with respect to the sample 400 so that the condensing position of the pulsed laser light L2 is located in an inspection region of the sample 400.

In order to analyze the light from the sample 400 (hereinafter referred to as "inspection light") generated by the radiation of the pulsed laser light L2, a spectroscope 401 is mounted in the laser device 1B via an optical fiber 402. Further, the laser device 1B includes an optical branching filter 7, a reflection part 8, and an accommodation part 5B.

The optical branching filter 7 is disposed between the lens 36 and the condensing optical system 4. The optical branching filter 7 transmits the pulsed laser light L2, while reflecting inspection light L3 that is from the sample 400 and is condensed by the condensing optical system 4. The optical branching filter 7 is, for example, a wavelength selection filter.

The reflection part 8 reflects the light reflected by the optical branching filter 7 to be incident on one end of the optical fiber 402 mounted in the accommodation part 5B.

The accommodation part 5B accommodates an incident optical system 23 included in the excitation light supply part 2, the optical oscillator 3A, the condensing optical system 4, the optical branching filter 7, and the reflection part 8. An optical fiber 21 is mounted in a first end wall 5a of the accommodation part 5B, and an optical fiber 402 is mounted in a third end wall 5d. Further, an opening 5c for outputting the pulsed laser light L2 is formed in a second end wall 5b of the accommodation part 5B. The opening 5c is closed by the condensing optical system 4. As a result, the pulsed laser light L2 can be output from the accommodation part 5B as in the case of the laser device 1A.

The pulsed laser light L2 output from the laser device 1B irradiates the inspection region disposed at the condensing position of the pulsed laser light L2. Thus, laser-induced breakdown occurs in the inspection region, resulting in plasma emission. Inspection light L3 generated by the plasma emission is incident on the condensing optical system 4 again and is reflected toward the reflection part 8 by the optical branching filter 7. The inspection light L3 reflected in this way is reflected by the reflection part 8 and is incident on the optical fiber 21. Since the optical fiber 21 is connected to the spectroscope 401, the inspection light L3 can be split by the spectroscope 401.

The laser device 1B can output the same pulsed laser light L2 as in the laser device 1A. The pulsed laser light L2 at the condensing position has high effective energy with respect to the energy of the excitation light L1. Therefore, it is possible to efficiently generate the laser-induced breakdown.

Figure 16:
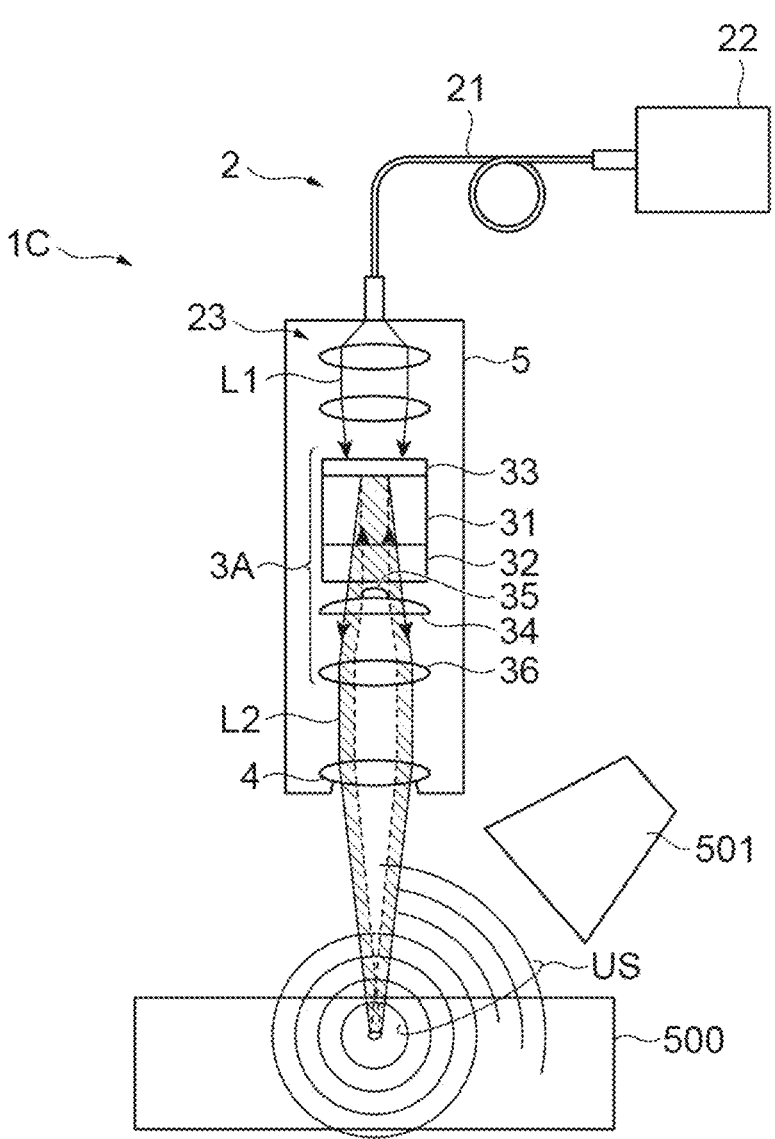
FIG. 16 is a schematic view of a sixth application example of the laser device.

FIG. 16 is a schematic view of a sixth application example. In FIG. 16, a laser device 1C which is a modified example of the laser device is used. The configuration of the laser device 1C is the same as that of the laser device 1A except that the window member 6 is not provided and the opening 5c is closed by the condensing optical system 4. Therefore, the laser device 1C outputs the pulsed laser light L2 which is the same as in the laser device 1A.

FIG. 16 shows an example when the laser device 1C is applied to photoacoustic imaging. Specifically, the laser device 1C irradiates an inspection target 500 such as a living tissue. At this time, the laser device 1C is disposed with respect to the inspection target 500 so that the pulsed laser light L2 is condensed in an inspection region within the inspection target 500.

When the inspection region is irradiated with the pulsed laser light L2, the inspection region thermally expands. Ultrasonic US is generated by the thermal expansion. The ultrasonic US is detected by a detector 501 (for example, a high-sensitivity micro-vibration detector).

The pulsed laser light L2 at the condensing position has high effective energy with respect to the energy of the excitation light L1. Therefore, it is possible to efficiently generate the thermal expansion and the associated ultrasonic US.

Figure 17:
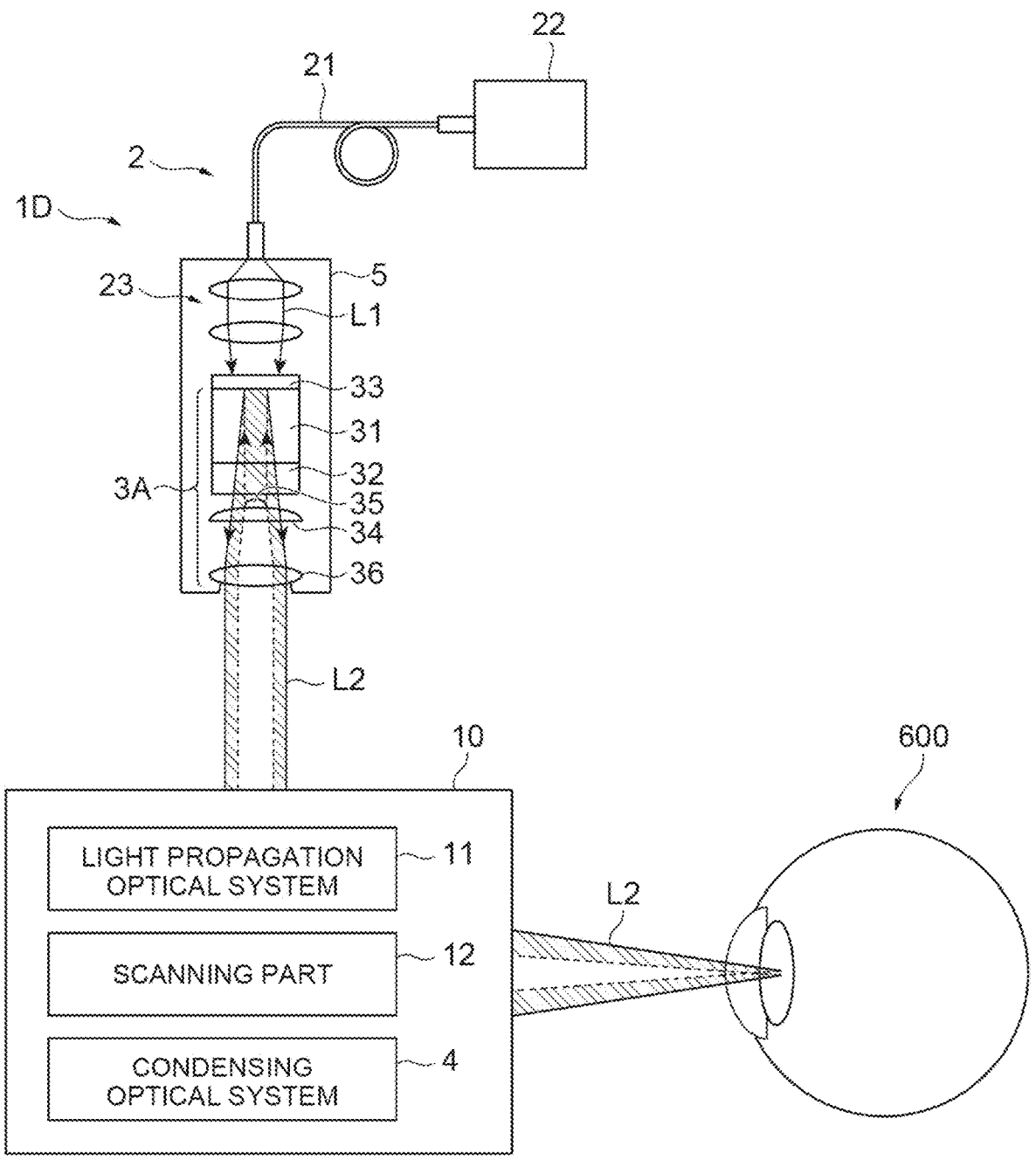
FIG. 17 is a schematic view of a seventh application example of the laser device.

FIG. 17 is a schematic view of a seventh application example. In FIG. 17, a laser device 1D which is a modified example of the laser device 1A is used. The laser device 1D is mainly different from the configuration of the laser device 1A in that a laser operation part 10 is further provided. The laser device 1D will be described focusing on such a difference. FIG. 17 shows an example in which the laser device 1D is applied to surgery of an eye 600 (for example, surgery for glaucoma, cataract, or the like).

The laser device 1D includes an excitation light supply part 2, an optical oscillator 3A, a condensing optical system 4, an accommodation part 5, and a laser operation part 10. Since the excitation light supply part 2, the optical oscillator 3A, and the condensing optical system 4 are the same as in the case of the laser device 1A, description thereof will be omitted.

The accommodation part 5 accommodates the incident optical system 23 included in the excitation light supply part, and the optical oscillator 3A. The accommodation part 5 is the same as the accommodation part of the sixth application example except that the condensing optical system 4 is not accommodated. The opening 5c of the accommodation part 5 is closed by the lens 36.

The laser operation part 10 includes a light propagation optical system 11, a scanning part 12, and a condensing optical system 4. The light propagation optical system 11 is an optical system that propagates the pulsed laser light L2 toward an eye 600 to be treated. The light propagation optical system 11 may be configured of, for example, a plurality of lenses, mirrors, and the like. A part of the scanning part 12 and the condensing optical system 4 also functions as a part of the light propagation optical system. The scanning part 12 is a part that scans the pulsed laser light L2 for treatment and has, for example, a mirror and a driving part that scans the mirror. The condensing optical system 4 condenses the pulsed laser light L2 as in the case of the laser device 1A.

The laser device 1D has an optical oscillator 3A. Therefore, the pulsed laser light L2 that is the same as in the optical oscillator 3A included in the laser device 1A is output. The laser operation part 10 has a condensing optical system 4 and condenses the pulsed laser light L2. Therefore, the laser device 1D has the same actions and effects as in the laser device 1A. Therefore, the pulsed laser light L2 at the condensing position has high effective energy with respect to the energy of the excitation light L1. Therefore, the eye 600 can be treated efficiently.

The various forms described above are examples of the present invention. The present invention is not limited to the various forms exemplified and is intended to include the scope indicated by the claims and all modifications within the meaning and scope equivalent to the claims.

Figure 18:
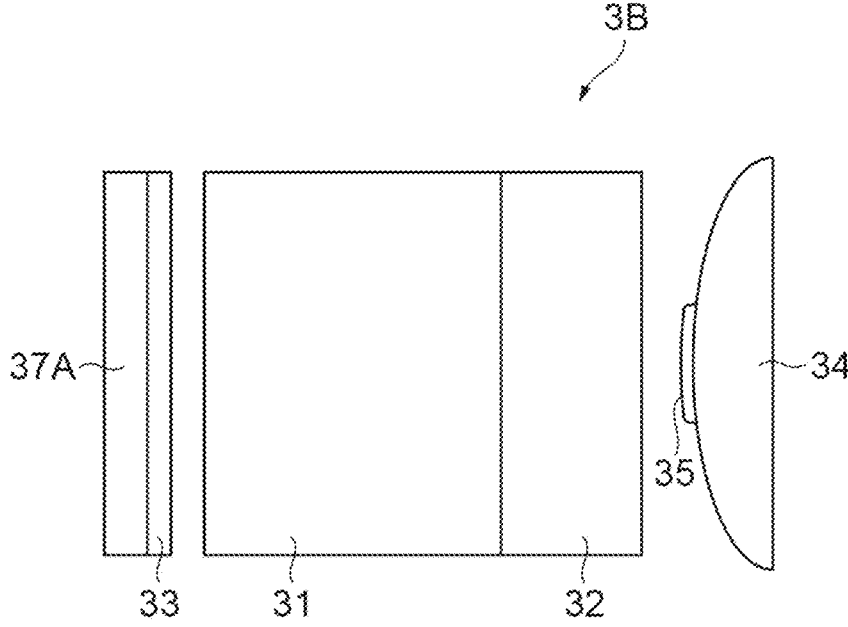
FIG. 18 is a schematic view showing a first modified example of the optical oscillator.

FIG. 18 is a schematic view showing a first modified example of the optical oscillator. The first reflection part 33 may be separated from the laser medium 31 as in the optical oscillator 3B shown in FIG. 18. In this case, for example, the first reflection part 33 may be supported by a support 37A that is transparent to the excitation light L1.

Figure 19:
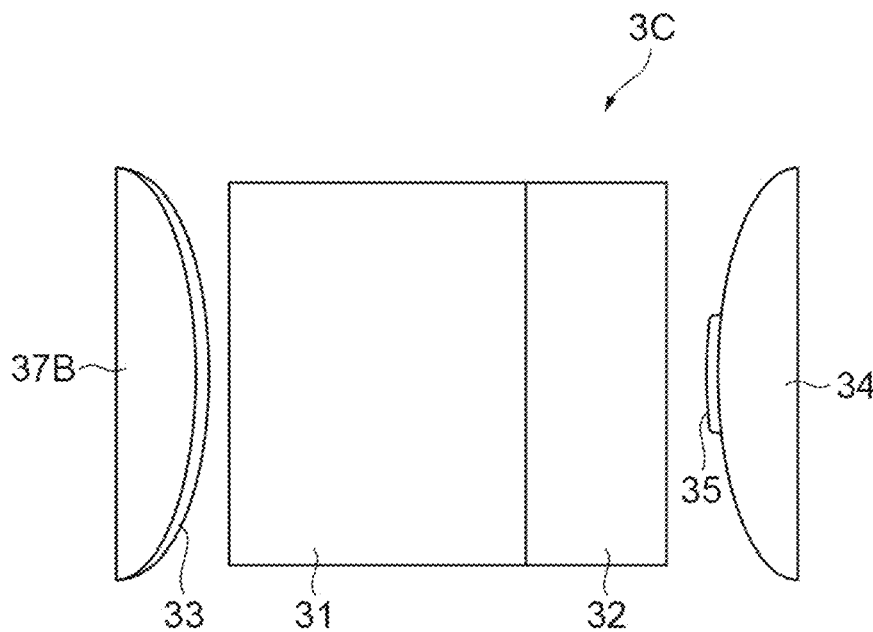
FIG. 19 is a schematic view showing a second modified example of the optical oscillator.

FIG. 19 is a schematic view showing a second modified example of the optical oscillator. An optical oscillator 3C shown in FIG. 19 is different from the optical oscillator 3A shown in FIG. 18 in that the first reflection part 33 is curved. In this case, for example, the first reflection part 33 may be supported by a support 37B which is transparent to the excitation light L1 and of which a support surface supporting the first reflection part 33 is curved. As long as the donut-shaped pulsed laser light L2 can be obtained, a curving direction of the first reflection part 33 may be opposite to a direction shown in FIG. 19.

Figure 20:
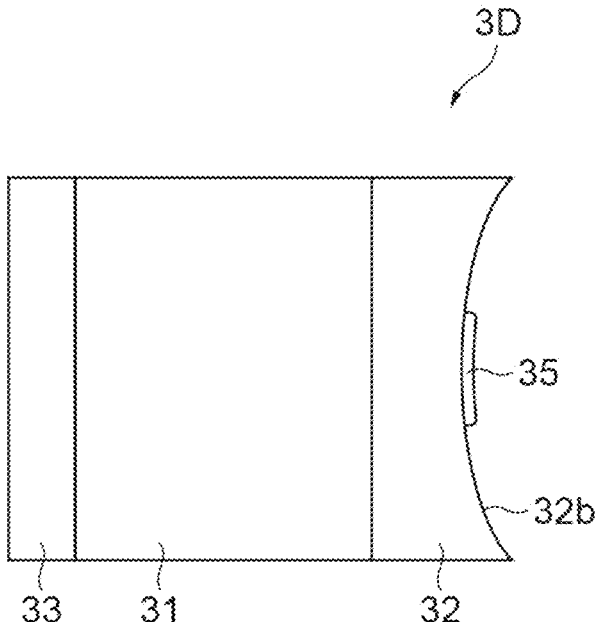
FIG. 20 is a schematic view showing a third modified example of the optical oscillator.

FIG. 20 is a schematic view showing a third modified example of the optical oscillator. As in the optical oscillator 3D shown in FIG. 20, the second reflection part 35 may be provided on the second end surface 32b of the Q-switch element 32. In this case, the second end surface 32b may be curved so that the second reflection part 35 is curved in a desired shape.

Figure 21:
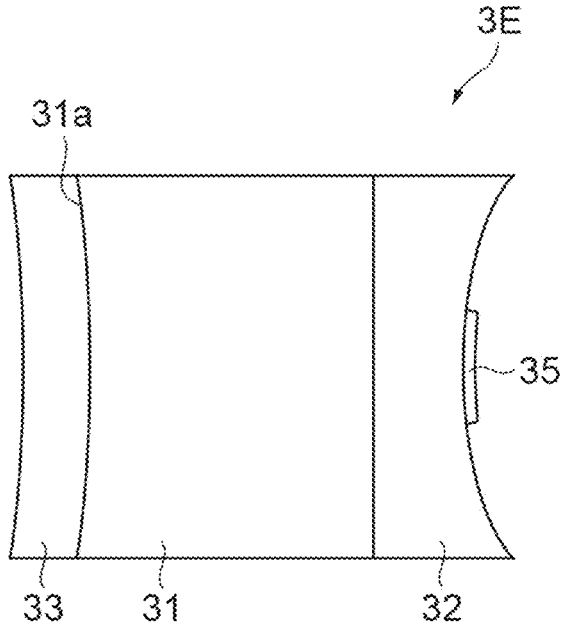
FIG. 21 is a schematic view showing a fourth modified example of the optical oscillator.

FIG. 21 is a schematic view showing a fourth modified example of the optical oscillator. An optical oscillator 3E shown in FIG. 21 is different from the optical oscillator 3D shown in FIG. 20 in that the first reflection part 33 is curved. In this case, the first end surface 31a of the laser medium 31 may be curved so that the first reflection part 33 is curved in a desired shape. As long as the donut-shaped pulsed laser light L2 can be obtained, the curving direction of the first reflection part 33 may be opposite to a direction shown in FIG. 21.

Figure 22:
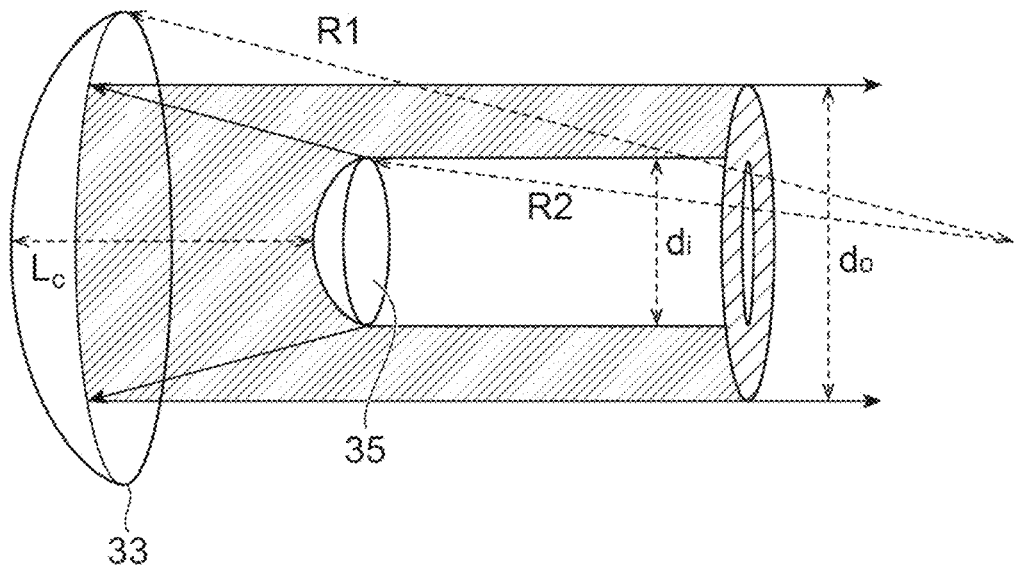
FIG. 22 is a drawing for describing a relationship between a radius of curvature and a magnification when a first reflection part and a second reflection part are curved.

As shown in FIG. 22, when the first reflection part 33 and the second reflection part 35 are curved, the first reflection part 33 and the second reflection part 35 may be reflection parts having R1 and R2 that can be expressed by the following Equations. R1 is a radius of curvature of the first reflection part 33, and R2 is a radius of curvature of the second reflection part 35.

$$R1 = -2Lc/(m-1)$$

$$R2 = 2mLc/(m-1)$$

In Equations of R1 and R2, m is the magnification m ($=d_o/d_i$) described with reference to FIG. 2, and Lc is the resonator length Lc described with reference to FIG. 1.

The $d_i$ in the magnification m corresponds to a size (a diameter, or the like) of the second reflection part 35, and the $d_o$ corresponds to a diameter of the output pulsed laser light (the donut beam). Therefore, the laser device can be designed to obtain a donut-shaped pulsed laser light having a desired magnification m using the above-described Equations of R1 and R2.

The saturable absorber exemplified as the Q-switch element and the laser medium may be separated from each other. When seen in an optical axis direction of the optical oscillator, a size of the saturable absorber may be larger than that of the second reflection part and smaller than that of the laser medium.

The laser device may further include a non-linear optical system (for example, a non-linear optical element) that has birefringent phase matching (BPM) for converting the annular laser light (for example, the donut beam-shaped pulsed laser light L2 of the above embodiment) output from the unstable resonator or quasi phase matching (QPM), or combines both. In this case, for example, since a conversion from fundamental waves with a wavelength of 1 μm (laser oscillation wavelength depends on an additive element that is the center of light emission) to a short wavelength such as a visible region and an ultraviolet region by harmonics and sum frequencies, and a combination of them including a parametric process and differential frequencies, and a conversion from a mid-infrared region to terahertz waves by a parametric process, and a difference frequency, and a combination of them including harmonics and sum frequencies can be efficiently performed, it is effective for processing and measurement. Further, the nonlinear optical system (for example, a non-linear optical element) is also useful for pulse shaping including pulse compression and expansion using a spectrum chirp.

The various embodiments and modified examples described above may be appropriately combined as long as they do not deviate from the gist of the invention.

REFERENCE SIGNS LIST

1A, 1B, 1C, 1D Laser device
2 Excitation light supply part
3A, 3B, 3C, 3D, 3E Optical oscillator
4 Condensing optical system
31 Laser medium
32 Q-switch element
33 First reflection part
34 Support
35 Second reflection part
36 Lens L1 Excitation light
L2 Pulsed laser light (annular laser light)
UR Unstable resonator

The invention claimed is:

1. An optical oscillator comprising:

a first reflection part configured to reflect light of a first wavelength;

a laser medium excited by excitation light of a second wavelength different from the first wavelength and configured to emit the light of the first wavelength;

a second reflection part disposed on a side opposite to the first reflection part with respect to the laser medium and configured to form an unstable resonator together with the first reflection part, the unstable resonator being configured to output annular laser light of the first wavelength; and a saturable absorption part disposed on the side opposite to the first reflection part with respect to the laser medium and of which a transmittance increases with absorption of the light of the first wavelength, wherein, when a power of the excitation light is indicated by $P_p$ (KW), and an inner diameter of the annular laser light is indicated by $d_i$ (mm), and an outer diameter is indicated by $d_o$ (mm), and $d_o/d_i$ is a magnification m, the magnification m satisfies a following Equation (1), $$a_0 + a_1 \log(P_p) \leq m \leq b_0 + b_1 P_p + b_2 P_p^2 \qquad (1)$$

provided that,
$a_0 = 1.421$
$a_1 = 0.10678$
$b_0 = 2.8698$
$b_1 = 0.79408$
$b_2 = -0.022536$.

2. The optical oscillator according to claim 1, wherein a size of the second reflection part is smaller than that of the first reflection part when seen from the first reflection part.

3. A laser device comprising:

the optical oscillator according to claim 1; and an excitation light supply part configured to output the excitation light supplied to the laser medium.

4. The laser device according to claim 3, further comprising a condensing optical system configured to condense the annular laser light output from the unstable resonator.

5. A laser device comprising:

an optical oscillator, wherein the optical oscillator comprises:

a first reflection part configured to reflect light of a first wavelength;

a laser medium excited by excitation light of a second wavelength different from the first wavelength and configured to emit light of the first wavelength;

a second reflection part disposed on a side opposite to the first reflection part with respect to the laser medium and configured to form an unstable resonator configured to output annular laser light of the first wavelength together with the first reflection part; and a saturable absorption part disposed on the side opposite to the first reflection part with respect to the laser medium and of which a transmittance increases with absorption of light of the first wavelength; and an excitation light supply part configured to output the excitation light supplied to the laser medium, wherein, when an inner diameter of the annular laser light is indicated by $d_i$ (mm), and an outer diameter is indicated by $d_o$ (mm), and $d_o/d_i$ is a magnification m, they magnification m is larger than $2^{1/2}$, when a power of the excitation light is 1.5 kW or more and 12 kW or less, the magnification m is 1.44 or more and 4.01 or less, when a power of the excitation light is 3 kW or more and 12 kW or less, the magnification m is 1.47 or more and 5.1 or less, or when a power of the excitation light is 6 kW or more and 12 kW or less, the magnification m is 1.50 or more and 6.82 or less.

6. The laser device according to claim 5, further comprising a non-linear optical system configured to convert the annular laser light output from the unstable resonator.

7. The laser device according to claim 6, further comprising a condensing optical system configured to condense the annular laser light output from the unstable resonator.

* * * * *